United States Patent
Buchalter et al.

(10) Patent No.: US 11,222,367 B2
(45) Date of Patent: *Jan. 11, 2022

(54) SYSTEMS, METHODS AND PROGRAMMED PRODUCTS FOR ELECTRONIC BIDDING ON AND ELECTRONIC TRACKING, DELIVERY AND PERFORMANCE OF DIGITAL ADVERTISEMENTS ON NON-PERSONAL DIGITAL DEVICES

(71) Applicant: Place Exchange, Inc., New York, NY (US)

(72) Inventors: Yehuda Ari Buchalter, Forest Hills, NY (US); Jason Shao, Edison, NJ (US); William T. Maslyn, Poughkeepsie, NY (US)

(73) Assignee: Place Exchange, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,738

(22) Filed: Jul. 30, 2020

(65) Prior Publication Data

US 2020/0380567 A1 Dec. 3, 2020

Related U.S. Application Data

(63) Continuation of application No. 16/820,091, filed on Mar. 16, 2020, now Pat. No. 10,776,832, which is a continuation of application No. 16/670,392, filed on Oct. 31, 2019, now Pat. No. 10,636,061, which is a continuation of application No. 16/353,550, filed on Mar. 14, 2019, now Pat. No. 10,504,158.

(Continued)

(51) Int. Cl.
*G06Q 30/02* (2012.01)

(52) U.S. Cl.
CPC ..... *G06Q 30/0275* (2013.01); *G06Q 30/0277* (2013.01)

(58) Field of Classification Search
None
See application file for complete search history.

(56) References Cited

U.S. PATENT DOCUMENTS 8,437,776 B2  5/2013  Busch
8,983,859 B2  3/2015  Nice et al.
(Continued)

FOREIGN PATENT DOCUMENTS

WO  2002029665 A1  4/2002
WO  2013016214 A1  1/2013

OTHER PUBLICATIONS

Michal Wlosik. "What Is Digital Out-of-Home (DOOH) Advertising and How Does It Work?" Dec. 2018. Available at https://clearcode.cc/blog/what-is-digital-out-of-home-dooh/ (Year: 2018).*

(Continued)

*Primary Examiner* — Eric R Netzloff
(74) *Attorney, Agent, or Firm* — Amster, Rothstein & Ebenstein LLP

(57) ABSTRACT

Systems and methods that provide electronic bidding on digital advertising placed on non-personal digital devices in public or semi-public settings and enable subsequent consumer actions taken on other media channels and devices to be attributed to such advertising in digital ad buying systems.

20 Claims, 25 Drawing Sheets

Related U.S. Application Data

(60) Provisional application No. 62/644,079, filed on Mar. 16, 2018.

(56) References Cited

U.S. PATENT DOCUMENTS

| | | |
|---|---|---|
| 9,239,868 B2 | 1/2016 | Neerincx et al. |
| 9,373,123 B2 | 6/2016 | Carlson et al. |
| 10,504,158 B2 | 12/2019 | Buchalter et al. |
| 2002/0013757 A1 | 1/2002 | Bykowsky et al. |
| 2004/0117257 A1 | 6/2004 | Haberman et al. |
| 2005/0044254 A1 | 2/2005 | Smith |
| 2009/0012867 A1 | 1/2009 | Lerman et al. |
| 2009/0012868 A1 | 1/2009 | DeAngelis |
| 2009/0030788 A1* | 1/2009 | Boudah ............ G09F 15/00 705/14.71 |
| 2009/0198579 A1 | 8/2009 | Lewis et al. |
| 2009/0265243 A1 | 10/2009 | Karassner et al. |
| 2012/0030034 A1 | 2/2012 | Knapp et al. |
| 2013/0137463 A1 | 5/2013 | Busch |
| 2013/0346550 A1 | 12/2013 | Higgins |
| 2015/0235275 A1 | 8/2015 | Shah et al. |
| 2016/0044358 A1 | 2/2016 | Zucchetta |
| 2016/0071167 A1* | 3/2016 | Jingle .............. G06Q 30/0275 705/14.71 |
| 2016/0125466 A1 | 5/2016 | Kulkarni et al. |
| 2016/0292744 A1* | 10/2016 | Strimaitis .......... G06Q 30/0269 |
| 2017/0103428 A1 | 4/2017 | Saifee et al. |
| 2017/0161793 A1 | 6/2017 | Knapp et al. |
| 2018/0173488 A1 | 6/2018 | Zenoff |
| 2019/0012868 A1* | 1/2019 | Okada ................ B42D 25/36 |
| 2019/0043080 A1 | 2/2019 | Buchalter |
| 2019/0318392 A1* | 10/2019 | Smith ................ G06Q 50/01 |

OTHER PUBLICATIONS

Chris Gadek. "How Is OOH Reach Calculated?" May 2020. Available at https://www.adquick.com/blog/how-is-ooh-reach-calculated/ (Year: 2020).*

Matty Alburger. "How OOH Uses Mobile Phone Location Data" Apr. 2019. Available at https://movia.media/moving-billboard-blog/how-ooh-uses-mobile-phone-location-data/ (Year: 2019).*

PCT International Search Report and Written Opinion dated May 5, 2020 in connection with PCT International Patent Application No. PCT/US2020/016399.

PCT International Search Report and Written Opinion dated Jan. 13, 2020 in connection with PCT International Patent Application No. PCT/US2019/059161.

International Search Report and Written Opinion dated May 24, 2019 issued in PCT/US2019/022268.

* cited by examiner

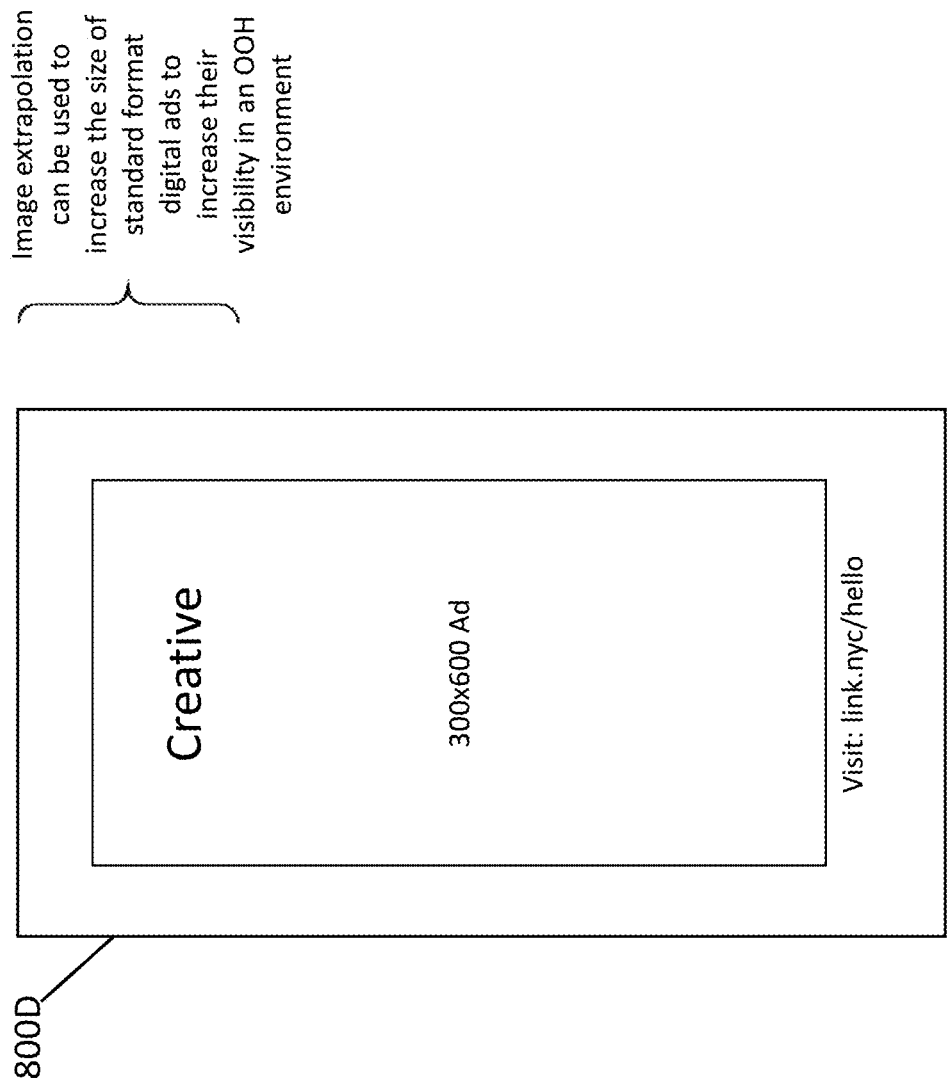

US 11,222,367 B2

SYSTEMS, METHODS AND PROGRAMMED PRODUCTS FOR ELECTRONIC BIDDING ON AND ELECTRONIC TRACKING, DELIVERY AND PERFORMANCE OF DIGITAL ADVERTISEMENTS ON NON-PERSONAL DIGITAL DEVICES

RELATED APPLICATIONS

This application is a continuation application claiming priority to and the benefit of U.S. patent application Ser. No. 16/820,091, filed Mar. 16, 2020 and entitled SYSTEMS, METHODS AND PROGRAMMED PRODUCTS FOR ELECTRONIC BIDDING ON AND ELECTRONIC TRACKING, DELIVERY AND PERFORMANCE OF DIGITAL ADVERTISEMENTS ON NON-PERSONAL DIGITAL DEVICES, which is a continuation application claiming priority to and the benefit of U.S. patent application Ser. No. 16/670,392, filed Oct. 31, 2019 and entitled SYSTEMS, METHODS AND PROGRAMMED PRODUCTS FOR ELECTRONIC BIDDING ON AND ELECTRONIC TRACKING, DELIVERY AND PERFORMANCE OF DIGITAL ADVERTISEMENTS ON NON-PERSONAL DIGITAL DEVICES, and which has since issued as U.S. Pat. No. 10,636,061, and which is a continuation application claiming priority to and the benefit of U.S. patent application Ser. No. 16/353,550, filed Mar. 14, 2019 and entitled SYSTEMS, METHODS AND PROGRAMMED PRODUCTS FOR ELECTRONIC BIDDING ON AND ELECTRONIC TRACKING, DELIVERY AND PERFORMANCE OF DIGITAL ADVERTISEMENTS ON NON-PERSONAL DIGITAL DEVICES, and which has issued as U.S. Pat. No. 10,504,158, and which in turn is a non-provisional application claiming priority to and the benefit of U.S. Provisional Patent Application No. 62/644,079, filed Mar. 16, 2018 and entitled SYSTEMS, METHODS AND PROGRAMMED PRODUCTS FOR ELECTRONIC BIDDING ON AND ELECTRONIC TRACKING, DELIVERY AND PERFORMANCE OF DIGITAL ADVERTISEMENTS ON ELECTRONIC DIGITAL DISPLAYS, the contents of all of which are incorporated herein by reference in their entirety.

TECHNICAL FIELD

The present disclosure is generally directed to systems, methods and program products for digital advertising on a non-personal digital device in a public or semi-public setting, and more particularly to systems, methods and program products for linking other forms of digital advertising (e.g., online, mobile, social, etc.) with digital advertising on a non-personal digital device.

BACKGROUND

Over the past decade, the advent of modern digital advertising technologies has transformed many forms of digital advertising. One hallmark of these digital advertising technologies (collectively referred to as "programmatic" advertising) is the ability to bid electronically on digital advertising opportunities, either in real-time, using so-called "real-time bidding" (RTB) techniques or in advance using so-called "private deal" techniques, via electronic platforms. Programmatic techniques for electronic bidding, including RTB and private deals, via digital ad buying systems enables buyers (e.g., agencies or advertisers) to electronically identify, and with a high level of precision, electronically target their digital advertisements and bid on exactly the electronic devices that best meet their business objectives for the digital advertisements to be placed. Programmatic digital advertising technology also enables buyers to directly associate subsequent consumer actions via the electronic devices (e.g., visiting a website or making an online purchase, to name a few) with the prior delivery of a digital advertisement, via a process called "attribution" that links the two events via a common identifier. The attribution process seeks to associate digital advertisements shown to a consumer and subsequent actions taken by the consumer. When the two events occur on different devices, the process is known as "cross-device attribution."

These programmatic benefits of precise targetability (via electronic bidding) and impact measurement (via attribution) have driven massive growth in many forms of digital advertising, including online display advertising, online video advertising, mobile advertising, social media advertising, and others—typically delivered on personal electronic devices such as laptop computers, desktop computers, smartphones, tablets, and other personal electronic devices.

However, it has not hitherto been possible to obtain these benefits in the context of digital advertising on a non-personal digital device, such as devices that may be in a public or semi-public setting (e.g., digital advertising displayed on digital billboards, on street kiosks, on trains or buses, in elevators, in taxis, in restaurants, in health clubs, in movie theaters, and/or in airports, to name a few) because of several technical reasons.

One technical issue associated with current digital ad buying systems, is that digital advertising delivered on personal electronic devices is assumed to be seen by one individual—e.g., a user of the personal electronic device. By contrast, digital advertising on a non-personal digital device in a public or semi-public setting may be seen by more than one individual, and often by many individuals, at the same time. Current programmatic techniques do not provide a technological solution to address the technical issues created by the situation involving multiple distinct individuals exposed to a single advertisement on a non-personal digital device. Efforts to date have focused on automating the buying of digital advertising on non-personal digital devices, but have failed to produce the capability using technology to track individual instances of the digital advertisements delivered to individual consumers ("impressions"). Some existing methods and systems attempt to record a so-called "impression multiplier" corresponding to the estimated number of consumers exposed to an advertisement on a non-personal digital device. However, these methods and systems suffer from technical drawbacks since they do not create individual atomic records of each impression, nor do they allow the capture of unique identifiers that can power attribution.

Another technical issue associated with current digital advertising systems arises because digital advertising delivered on personal electronic devices leverages the fact that those devices belong to specific individuals and typically have device-specific advertising identifiers (also referred to herein as "advertising identifiers") that can be used to recognize the device (which is then a proxy for the individual). Those identifiers are used to uniquely identify the advertising event and associate that event with a subsequent event on the same device (via same-device attribution) or another device belonging to the same individual (via cross-device attribution). By contrast, digital advertising on a non-personal digital device in a public or semi-public setting is, by definition, delivered on devices that have no association to the individuals seeing the advertising, and digital ad buying systems today have no means to associate subsequent events taken by the individuals exposed to the advertising in question. Efforts to date have focused on measuring aggregate statistical impact of exposure to digital advertising on non-personal digital devices (e.g., via surveys of exposed users or other sampling approaches), or on narrowly measuring direct consumer response to digital advertising on non-personal digital devices via some immediate call to action (e.g., scanning a unique QR code), but have failed to produce any technology to associate, within a digital ad buying system or an integrated measurement platform, subsequent consumer actions (e.g., visiting a website or making an online purchase) on a personal electronic device taken after the ad exposure on a non-personal digital device.

What is needed is a way to solve these technological problems with existing digital buying systems to enable (a) electronic bidding on digital advertising on non-personal digital devices, and (b) subsequent consumer actions taken on personal electronic devices to be attributed to such digital advertising.

SUMMARY OF THE INVENTION

An object of the present invention is to enable (a) electronic bidding on digital advertising on non-personal digital devices, and (b) subsequent consumer actions taken on personal electronic devices to be attributed to such digital advertising.

Another object of the present invention is to implement a specific technological application to enable buying and measurement of digital advertising on non-personal digital devices in public or semi-public settings, which is seamlessly integrated with the systems and methods for buying and measurement of digital advertising in other channels and on other devices and platforms.

Another object of the present invention is to provide systems and methods that:

1) track individual impressions, e.g., instances of digital advertising on non-personal digital devices in public or semi-public settings which may have been seen by a specific group of consumers, by associating them with personal electronic devices carried by those consumers via the personal electronic device identifiers, and 2) enable the association of those impressions to subsequent actions that may be taken by those same consumers, either on the exposed personal electronic devices or on other personal electronic devices owned by those consumers, by supplying device-specific advertising identifiers to digital ad buying systems or other integrated measurement platforms that track those subsequent actions and can match them to the impressions, thereby leveraging a variety of ID-matching approaches.

These technological solutions have heretofore not been applied in this context.

A method in accordance with exemplary embodiments of the present invention comprises: (A) receiving, at one or more computers, from a non-personal digital device, an indication that an ad slot will be available for display of a digital advertisement on the non-personal digital device at a first period of time; (B) calling, by the one or more computers, N digital ad buying systems, where N is equal to one or more, the step of calling comprising: (i) estimating, by the one or more computers, a projected number of advertising impressions related to the digital advertisement displayed by the non-personal digital device during the first period of time; (ii) generating an impression estimate X based on at least the projected number of advertising impressions; (iii) generating, by the one or more computers, Y bid requests for each of the N digital ad buying systems, where Y is equal to the number of different messages required to express advertising formats supported by both the non-personal digital device and the N digital ad buying systems; and (iv) sending, by the one or more computers, to each of the N digital ad buying systems, the Y bid requests, with each of the Y bid requests comprising the impression estimate X; and (C) receiving, by the one or more computers, from each of the N digital ad buying systems, Y bid responses to the Y bid requests, wherein the Y bid responses include Z bids, where Z is equal to one or more, each of the Z bids comprising: (i) pricing information associated with a price that a respective digital ad buying system of the N digital buying systems is willing to pay per impression; (ii) digital advertisement creative information, wherein the digital advertisement creative information includes at least one of a digital advertisement creative or an identifier associated with a previously registered digital advertisement creative, where the digital advertisement creative is to be displayed in the case where the bid response is a winning bid response; (iii) metadata associated with the digital advertisement creative information; and (iv) digital ad buying impression data configured for registering up to X impressions in the respective digital ad buying system; (D) selecting, by the one or more computers, from at least some of the bid responses received from the N digital ad buying systems, a winning bid included in a winning bid response associated with a winning digital ad buying system of the N digital buying systems associated with a winning advertiser; (E) notifying, by the one or more computers, the winning digital ad buying system of the winning bid included in the winning bid response, the step of notifying comprising: (i) obtaining, by the one or more computers, from the winning bid response, X sets of digital ad buying impression data provided by the winning digital ad buying system associated with the winning advertiser, the X sets of digital ad buying impression data configured to generate one or more won impression notifications after receipt of an initial win notification; (ii) generating, by the one or more computers, X won impression notifications based on at least the obtained X sets of digital ad buying impression data; (iii) generating, by the one or more computers, X unique placeholder advertising identifiers; (iv) appending, by the one or more computers, the X unique placeholder advertising identifiers to the X won impression notifications; and (v) sending, from the one or more computers to the winning digital ad buying system, the X won impression notifications with the appended unique placeholder advertising identifiers; (F) accessing, by the one or more computers, the digital advertising creative associated with the winning bid; (G) formatting, by the one or more computers, the winning digital advertising creative for display on the non-personal digital device, the step of formatting comprising: (i) modifying, by the one or more computers, the winning digital advertising creative to optimize size and location associated with the display of the winning digital advertising creative on the non-personal digital device; (ii) extracting, by the one or more computers, from the winning digital advertising creative, one or more ad tags for capturing information related to delivery of the winning digital advertising creative; and (iii) extracting, by the one or more computers, from the winning digital advertising creative, one or more click trackers provided for recording interactions and recording events initiated on one or more personal electronic devices associated with one or more consumers exposed to the winning digital advertising creative.

In exemplary embodiments in accordance with present invention, the step of accessing comprises identifying the digital advertising creative information associated with the winning digital advertising creative.

In exemplary embodiments in accordance with present invention, the step of accessing comprises receiving the winning digital advertising creative from an ad server.

In exemplary embodiments in accordance with present invention, the step of formatting further comprises: (iv) determining whether an entire available display area of the non-personal digital device is occupied by the winning digital advertising creative; and (v) upon the condition that the winning digital advertising creative does not occupy the entire available display area of the non-personal digital device, adding, by the one or more computers, to the winning digital advertising creative, at least one of a design element or content.

In exemplary embodiments in accordance with present invention, the step of formatting further comprises: (iv) appending, by the one or more computers, a consumer-executable call-to-action to the digital advertising creative that can be performed on the one or more personal electronic devices.

In exemplary embodiments in accordance with present invention, the method further comprises (H) translating, by the one or more computers, plays of the formatted digital advertising creative on the non-personal digital device into one or more impressions associated with actual device-specific advertising identifiers, the step of translating comprising: (i) collecting, by the one or more computers, observation data comprising data associated with one or more observed personal electronic devices, the observation data comprising: 1) one or more actual device-specific advertising identifiers comprised of at least one of: mobile advertising IDs, browser cookies, account user names, e-mail addresses or hashed e-mail tokens; 2) location data; and 3) an observation timestamp indicating a time an observation occurred; (ii) determining, by the one or more computers, based on the observation data, one or more impressions corresponding to the one or more observed personal electronic devices that were within a predetermined viewable geometry around the non-personal digital device during the first time period; and (iii) substituting, by the one or more computers, the one or more placeholder advertising identifiers with the one or more collected actual device-specific advertising identifiers associated with the one or more impressions.

In exemplary embodiments in accordance with present invention, the impression estimate X is determined based on at least one of the following data items: (i) rating agency data from rating agencies; (ii) network connection data from network connections; (iii) sensor data collected from one or more sensors; (iv) the observation data; or (v) mobile application data from one or more mobile applications.

In exemplary embodiments in accordance with present invention, the step of determining an impression estimate X comprises calculating, by the one or more computers, an estimation of viewers based on a combination of data from a plurality of estimation data sources.

In exemplary embodiments in accordance with present invention, the step of determining an impression estimate X comprises adjusting, by the one or more computers, obtained estimation data for at least one of: time of day, day of week, seasonality and observational data skew, real-time network activity, or real-time sensor data.

In exemplary embodiments in accordance with present invention, the step of generating, by the one or more computers, Y bid requests in an appropriate format, comprises the steps of: identifying, by the one or more computers, display capabilities of the non-personal digital device; translating, by the one or more computers, the display capabilities into one or more standard digital formats that can be displayed given the display capabilities of the non-personal digital device either through direct transformation or composition with other elements; and generating, by the one or more computers, for each of the N digital ad buying systems, the Y bid requests each associated with the one or more standard digital formats.

In exemplary embodiments in accordance with present invention, the display capabilities comprise at least one of the following: (i) screen resolution; (ii) display size; (iii) video support; (iv) computational capacity; (v) audio capabilities; or (vi) zoning restrictions.

In exemplary embodiments in accordance with present invention, the observation data is collected from a plurality of different observation data sources through an application programming interface.

In exemplary embodiments in accordance with present invention, the method further comprises: (I) normalizing, by the one or more computers, the observation data, wherein the step of normalizing comprises the steps of: (i) translating, by the one or more computers, observation data from data providers into a standardized format; and (ii) validating, by the one or more computers, observation data from data providers by eliminating invalid data, the invalid data comprising at least one of the following: (a) observation data provided in an invalid format; (b) observation data provided after a published expiration window; (c) observation data provided with insufficient fidelity or accuracy, as measured against trusted sources; (d) observation data provided which was interpolated from a lower-resolution data-source; (e) observation data provided which exhibits irregularities in distribution; or (f) observation data that is duplicative with other observation data.

In exemplary embodiments in accordance with present invention, the method further comprises: (H) generating, by the one or more computers, a single proxy-ID associated with one or more non-personal digital devices potentially viewed by a unique group of consumers, based on at least one of the following: configurable intervals of time, observed personal devices or computer vision analysis; and (I) sending, by the one or more computers, the proxy-ID with each of the Y bid requests, to the N digital ad buying systems so that the one or more computers allow the digital ad buying systems to perform frequency capping and prevent over-exposure of a group of consumers near a particular non-personal digital device to a particular advertiser campaign or creative.

In exemplary embodiments in accordance with present invention, the method further comprises: (I) removing observation data associated with one or more personal electronic devices on which personal device restrictions are enabled for distribution of at least one of device-specific advertising identifiers or location information.

In exemplary embodiments in accordance with present invention, the method further comprises: (H) determining, by the one or more computers, whether the bid responses contain valid digital advertisement creatives, wherein the step of determining comprises: (i) determining, by the one or more computers, whether the bid responses contain a digital advertisement creative that was previously approved; (ii) determining, by the one or more computers, whether the bid responses contain a digital advertisement creative that was previously rejected; and (iii) determining, by the one or more computers, whether the bid responses contain a digital advertisement creative with non-reviewed status.

In exemplary embodiments in accordance with present invention, the step of determining, by the one or more computers, whether the bid responses are valid comprises at least one of the following steps: (iv) receiving, at the one or more computers, non-reviewed digital advertisement creatives from the digital ad buying systems, in real-time during the electronic bidding process or in advance, prior to the electronic bidding process, wherein the step of receiving comprises at least one of the following: (1) identifying, by the one or more computers, non-reviewed digital advertisements; (2) providing, at the one or more computers, an application programming interface allowing for submission of new digital advertisements for review; or (3) determining, by the one or more computers, previously rejected bid responses with non-reviewed digital advertisement creatives to identify digital advertisement creatives needing review; (v) converting, by the one or more computer systems, formatted digital advertisements into image or video representations for review by publishers to determine approved or rejected status; (vi) providing, by the one or more computers, a graphical user interface to allow for review and correction of metadata associated with a digital advertisement creative; or (vii) providing, by the one or more computers, workflow consistent with a required sequence of multiple reviewers or review processes.

In exemplary embodiments in accordance with present invention, the method further comprises: (I) dynamically identifying, by the one or more computers, actions performed on the one or more observed personal devices in direct response to a call to action in the digital advertising creative displayed on the non-personal digital device, wherein the step of dynamically identifying comprises: (i) receiving, at the one or more computers, from at least one of the one or more observed personal electronic devices, an indication that a direct response to the call-to-action was performed; (ii) retrieving, by the one or more computers, at least one of an associated advertisement auction identifier, an associated digital advertising campaign identifier, or an associated digital advertising creative identifier by matching against attributes of the call-to-action response; (iii) appending, by the one or more computers, (a) the actual device-specific advertising identifier associated with the at least one of the one or more observed personal electronic devices and (b) the at least one of the associated advertisement auction identifier, the associated digital advertising campaign identifier, or the associated digital advertising creative identifier, to the extracted one or more click trackers; (iv) performing, by the one or more computers, a virtual consumer action using the extracted one or more click trackers as appended, to allow the winning digital ad buying system to track an event corresponding to the direct response to the call-to-action; and (v) in association with performance of the virtual consumer action, triggering the one or more click trackers with the appended device-specific advertising identifiers and the at least one of the associated advertisement auction identifier, the associated digital advertising campaign identifier, or the associated digital advertising creative identifier, so as to register the virtual consumer action in the winning digital ad buying system.

In exemplary embodiments in accordance with present invention, the call-to-action comprises at least one of: transmission of an SMS, MMS or other messaging system message, visit to a pre-defined webpage URL, scanning of a QR code and execution of an associated embedded action, e-mailing a pre-defined e-mail address, executing a command within an associated computer application, scanning of a coupon code, placing a call to a unique call-tracking telephone number, or posting a social media message with a unique hashtag.

In exemplary embodiments in accordance with present invention, the attributes of the call-to-action comprises at least one of: date of the call-to-action, time of the call-to-action, an advertising campaign associated with the call-to-action or a keyword associated with the call-to-action.

In exemplary embodiments in accordance with present invention, the method further comprises: (I) identifying, by the one or more computers, the one or more impressions; and (J) sending, by the one or more computers, the one or more impressions to the winning digital ad buying system or an integrated measurement platform associated with the winning digital ad buying system within a timeframe allowing the one or more impressions to be associated, by virtue of the appended device-specific advertising identifiers and at least one of an associated advertisement auction identifier, an associated digital advertising campaign identifier, or an associated digital advertising creative identifier, with other events performed on the one or more personal electronic devices and recorded by the winning digital ad buying system or an integrated measurement platform, so as to enable the attribution process within the winning digital ad buying system or the integrated measurement platform, for impressions delivered on non-personal digital devices.

In exemplary embodiments in accordance with present invention, the digital advertisement comprises digital messages for display on the non-personal digital device.

In exemplary embodiments in accordance with present invention, the digital messages comprise at least one of text, image or video.

In exemplary embodiments in accordance with present invention, the digital advertisement comprises audio messages for play automatically or on-demand on the non-personal digital device.

In exemplary embodiments in accordance with present invention, the Y bid requests represent digital formats or capabilities which the non-personal digital device is able to support.

In exemplary embodiments in accordance with present invention, the digital formats or capabilities comprise at least one of: (i) device-specific ad formats; (ii) IAB standard ad units; (ii) VAST video; (iii) device representations; or (iv) at least one of website or application identifiers.

In exemplary embodiments in accordance with present invention, the location data for observations comprises at least one of: (i) latitude and longitude data; (ii) Geohash data; (iii) real-time network usage data; (iv) sensor-collected data; (v) application-derived user location data; or (vi) purchased third-party location data.

In exemplary embodiments in accordance with present invention, the ad tags comprise at least one of impression trackers or measurement code.

In exemplary embodiments in accordance with the present invention, the step of selecting comprises: (i) filtering, by the one or more computers, the at least some of the bid responses based on filtering criteria so as to determine two or more potential winning bid responses; and (ii) selecting, by the one or more computers, the winning bid from the two or more potential winning bid responses based on winning bid criteria.

In exemplary embodiments in accordance with present invention, the winning bid criteria comprises at least one of a highest price, campaign pacing, campaign fulfillment thresholds, publisher frequency limits, publisher advertiser whitelists/blacklists, or content relevance.

In exemplary embodiments in accordance with present invention, the filtering criteria comprises at least one of whether the bid meets minimum pricing requirements, whether the digital advertising creative associated with the bid has been reviewed and approved for display, or whether the bid matches any relevant private deals.

In exemplary embodiments in accordance with present invention, device-specific ad unit formats comprise at least one of non-IAB standard dimensions that may be more common on non-personal digital devices, such as 1024×768, 1920×1080, 1080×1920, 720×1280, and 3840×2160, to name a few. Format details may also include details such as aspect ratio and diagonal size of the non-personal digital device.

In exemplary embodiments in accordance with present invention, IAB standard ad units include those that have been outlined by the Interactive Advertising Bureau (IAB) in their Display & Mobile Advertising Creative Format Guidelines. Specific examples include medium rectangle (300×250), wide skyscrape (160×600), leaderboard (728×90), and half page (300×600), to name a few.

VAST video is the digital Video Ad Serving Template (VAST), another IAB standard specification that details the transmission of video advertising along with tracking instructions to measure completion rates and interaction with either the video or the video player.

In exemplary embodiments in accordance with present invention, examples of device representations include operating system (e.g., Windows, Chrome, Android, iOS, etc.), browser (e.g., Internet Explorer, Chrome, Safari), and corresponding build and version numbers. Device representation may also include details regarding enabled or disabled attributes of the digital devices, such as audio and video or specific supported file formats (e.g., .wav, .mp3, .mp4, Adobe Flash, .png, .gif, .jpg), to name a few.

In exemplary embodiments in accordance with present invention, examples of website/application identifiers include domain URLs, IAB category IDs, mobile application store app IDs, and mobile application build or version numbers, to name a few.

These and other features and advantages of the present invention will be presented in more detail in the following detailed description and the accompanying figures which illustrate by way of example principles of the invention.

DESCRIPTION OF THE DRAWINGS

The features and advantages of exemplary embodiments of the present invention will be more fully understood with reference to the following detailed description when taken in conjunction with the accompanying figures, wherein:

FIGS. 8A-8F illustrate an exemplary display screen of a non-personal digital device in accordance with exemplary embodiments of the present invention.

DETAILED DESCRIPTION

Figure 1:
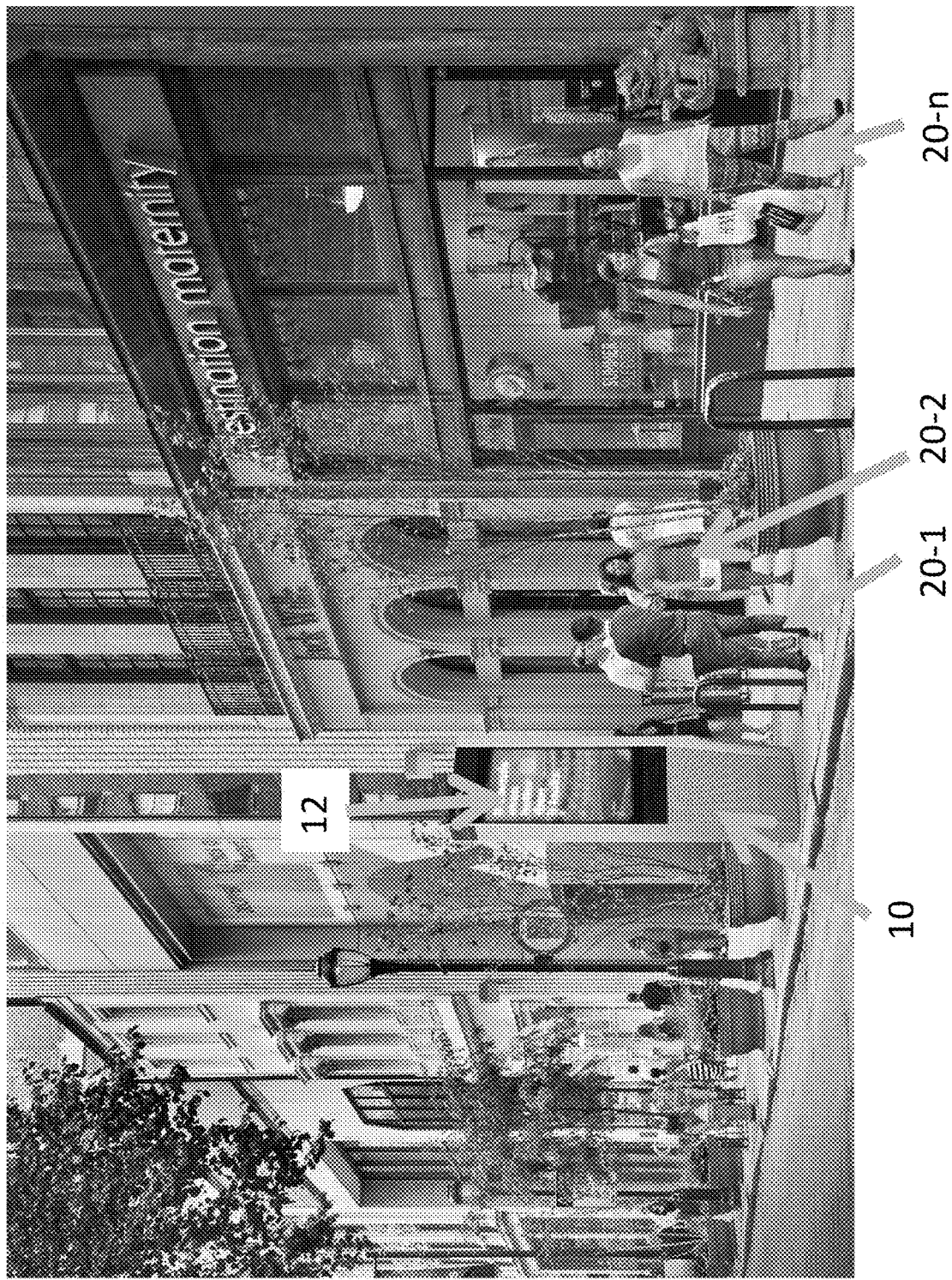
FIG. 1 illustrates an exemplary environment in which a digital advertisement is displayed on a network-connected digital display system for a non-personal digital device in accordance with exemplary embodiments of the present invention.

The present disclosure is generally directed to systems, methods and program products for digital advertising on non-personal digital devices in public or semi-public settings, and more particularly to systems, methods and program products for linking other forms of digital advertising (e.g., online, mobile, social, etc.) with digital advertising on a non-personal digital device.

Various embodiments of the present invention address technological challenges associated with current and traditional electronic bidding, delivery, and tracking systems for digital advertising. Existing digital ad buying systems face technological challenges with providing the capability to bid on digital advertisement placements on non-personal digital devices. Existing digital ad buying systems also face technological challenges with providing the capability to individually and electronically track and communicate digital advertisements delivered to consumers viewing non-personal digital devices and automatically match those impressions to enable attribution of subsequent actions by those consumers (e.g., visiting a website, downloading an app, or buying products online or offline) on a personal electronic device via a process of analyzing disparate events believed to be associated with the same consumer to establish a connection between the advertisement and subsequent action ("attribution").

In exemplary embodiments, the present invention addresses this technological problem by providing a system to enable: 1) purchase, by digital ad buying systems (e.g., "demand side platforms", "DSPs", "ad servers" or "bidders"), of the opportunity to display a digital advertisement on a non-personal digital device in a public or semi-public setting, using an adaptation of electronic bidding that enables the platforms to track and measure the exposure to individual consumers ("individual impressions") associated with the display of that advertisement; 2) identification and collection of "observations" of personal electronic devices, with device-specific advertising identifiers (e.g., Apple's IDFA or Android's AAID), belonging to a consumer located in a position ("viewing geometry") relative to a non-personal digital device in a public or semi-public space at a time of an advertisement on that device from which the consumer could have observed the advertisement; and/or 3) relaying of the device-specific advertising identifiers and associated information via the unique programmatic integration, in a privacy-compliant manner, to digital ad buying systems, allowing them or other integrated measurement platforms to associate subsequent actions taken by those consumers to the impressions on non-personal digital devices (thereby enabling an array of operations within the digital ad buying system or other integrated measurement platforms, including, e.g., planning, reporting, attribution, analytics, and campaign optimization). Examples of such integrated measurement platforms include MarketShare, DataSong, Convertro, VisualIQ, Adometry, C3 Metrics, ThinkVine, Clear Saleing, Encore, and Marketing Evolution, to name a few.

In exemplary embodiments, the technological solution of the present invention (i) collects personal electronic device observations from multiple sources, (ii) communicates opportunities to buy digital advertising via electronic bidding to digital ad buying systems, (iii) translates instances of the successful purchase and display of a digital advertisement on a non-personal digital device ("plays") into the number of individual consumers ("projected impressions") expected to be exposed to the digital advertisement, for digital ad buying systems, (iv) combines device observations with projected impressions to create impressions corresponding to exposure of consumers (identified by personal electronic device advertising identifiers) to digital advertisements, communicates information about the observations (including device-specific advertising identifiers) to the digital ad buying systems or other integrated measurement platforms to enable subsequent attribution, and/or (v) manages the time difference between when electronic bidding occurs and when information from device observations is available.

In exemplary embodiments, the inventive system includes at least some of the following features: (i) electronic notification(s) to potential bidders of when an opportunity to play a digital advertisement on non-personal digital devices is about to come up; (ii) automatic collection of observation records associated with personal electronic devices from disparate sources (e.g., external data providers, mobile apps, etc.); (iii) adapted electronic bidding calls to support one-to-many semantics, including individual impression logging, budgeting, and/or pacing calculations by the digital ad buying systems; (iv) adapted electronic bidding calls to support separating real-time impression logging and budget and pacing calculations from receipt of actual device-specific advertising identifiers; and/or (v) matching information from personal electronic device observations (including device-specific advertising identifiers) with corresponding digital advertisement plays, to generate individual advertising impressions delivered. These and other features are discussed in more detail herein.

FIG. 1 illustrates an exemplary environment in accordance with the exemplary embodiments of the present invention in which a digital advertisement is displayed on a network-connected non-personal digital device 10. The digital advertisement may include digital messages (e.g., text messages, image messages, video messages, and/or a combination thereof, to name a few) and/or audio messages played automatically or on-demand on the non-personal digital device 10.

Figure 2:
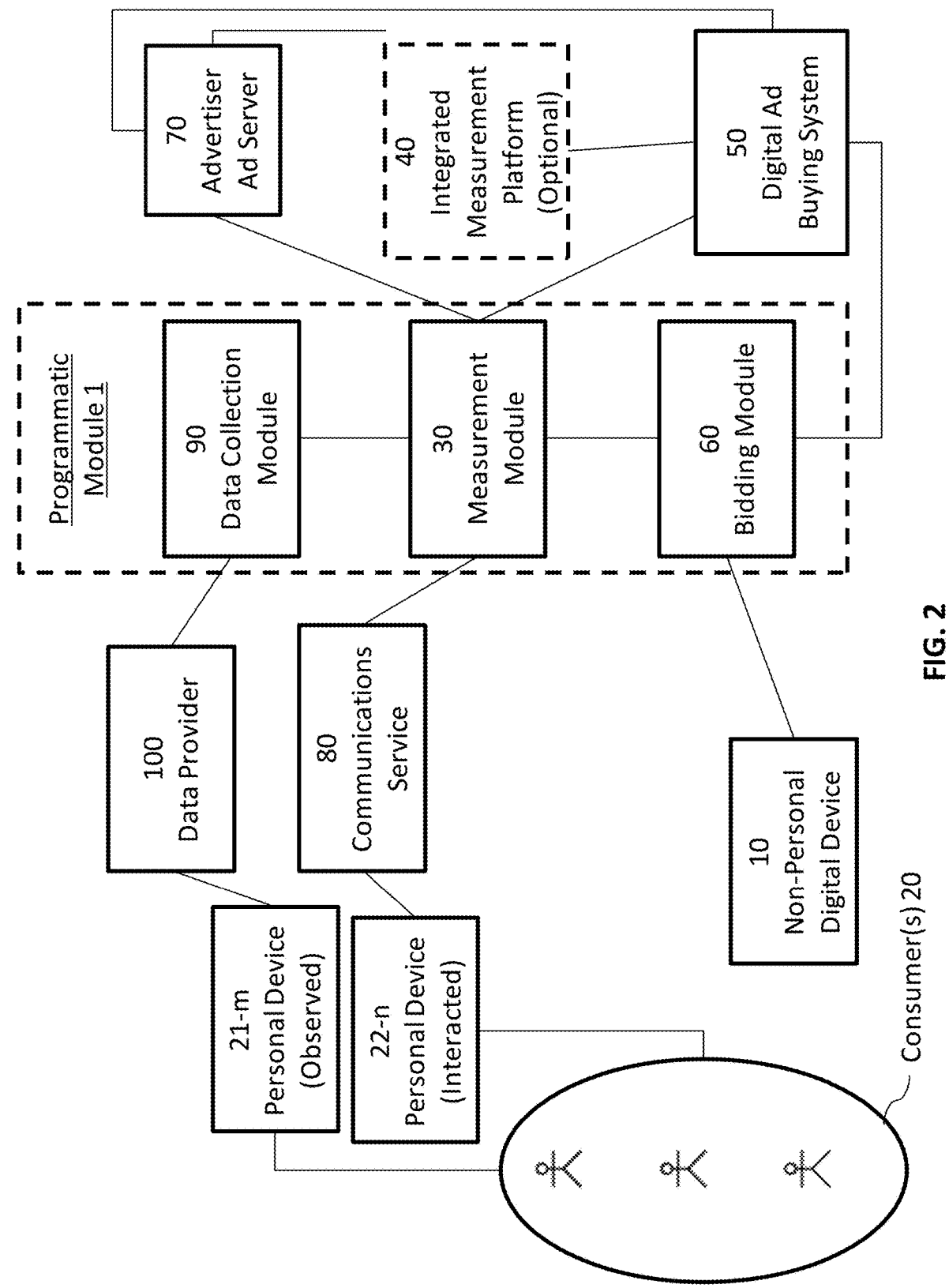
FIG. 2 illustrates an exemplary configuration of participant systems and platforms in accordance with exemplary embodiments of the present invention.

In practice, a digital advertisement is displayed on a monitor 12 of the non-personal digital device 10. During the time the digital advertisement is displayed, various individuals 20-1, 20-2 . . . 20-n may be passing by the non-personal digital device 10 within a viewing geometry. Each individual 20-1, 20-2 . . . 20-n may possess one or more personal electronic devices 21-1 . . . 21-m, 22-1 . . . 22-m (as shown in FIG. 2), such as mobile phones, tablets, computers, to name a few, through which such individuals may, at some later time, take some action (e.g., a website visit, app download, product purchase, etc.) related to the product or service promoted in the digital advertisement being displayed. In exemplary embodiments, the digital advertising creative can include a unique response channel, such as a coupon code, a QR code, unique URL address, a unique call-tracking telephone number, a unique SMS short code, a unique social media hashtag, a unique email address, to name a few. A consumer action through such a response channel would constitute a response to the digital advertisement, but is not necessary in order for the present invention to enable attribution. In various exemplary embodiments, the methods and systems of the present invention may be capable of providing appropriate data to enable "post-view" attribution (as opposed to "post-click" attribution) in which a consumer's purchase of a product (or some other action) is associated with a previously-viewed digital advertisement on a non-personal digital device, without the consumer having to first perform any action in direct response to the digital advertisement.

While FIG. 1 represent the non-personal digital device 10 as an outdoor display known as a "Link" unit, other non-personal network-connected digital devices and electronic displays in public and semi-public settings can also be used in accordance with exemplary embodiments of the present invention, such as the digital urban panel shown in FIGS. 3A-3C (discussed below). For example, network-connected screens on non-personal digital devices placed in transit stations and platforms, airports, building lobbies, elevators, on the exteriors or interiors of motor vehicles, in retail or commercial locations such as malls, grocery stores, restaurants, movie theaters, and health clubs, on digital billboards, digital street signs, and/or digital map/wayfinding displays, to name a few.

FIG. 2 illustrates an exemplary configuration of participant systems and platforms in accordance with exemplary embodiments of the present invention. It will be appreciated that each of the devices, systems and modules illustrated in FIG. 2 are represented as a single unit, but may be comprised of one or more units consistent with embodiments of the present invention or may be parts of a larger aggregated unit that performs multiple functions.

As illustrated in FIG. 2, components of the present invention in accordance with exemplary embodiments may include a programmatic module, generally designated by reference number 1, made up of a bidding module 60, a measurement module 30 and a data collection module 90. These components, more fully described below, may be connected either directly or through a network connection (e.g., the Internet) and interact (also either directly or indirectly via a network connection) with other devices, systems and platforms within an operating environment to carry out the various aspects of the present invention. For example, the operating environment may include a communications service 80, a digital ad buying system 50 ("DSP"), an advertiser ad server 70, an integrated measurement platform 40 (optional), and a data provider 100, to name a few. In accordance with the exemplary embodiments, digital advertisements may be placed by advertisers using the digital ad buying system 50 through advertiser ad server 70 to be recorded by the measurement module 30 when displayed by non-personal digital device 10. Although the digital ad buying system 50, integrated measurement platform 40, and advertiser ad server 70 are shown as separate components, it should be appreciated that these components may be modules of one or more components, or may be embodied in a single component having all of the functionality of these components. Although the bidding module 60, measurement module 30 and data collection module 90 are shown as separate components, it should be appreciated that these components may be modules of one or more components, or may be embodied in a single component having all of the functionality of these components. Further, it should be appreciated that these components may be associated with a computer-readable medium coupled to one or more data processing apparatus having executable instructions stored thereon which, when executed by the one or more data processing apparatus, cause the one or more data processing apparatus to perform the processes described herein.

At any given period in time, an individual 20-1 . . . 20-$n$, who may possess one or more personal electronic devices 21-1 . . . 21-$m$, 22-1 . . . 22-$n$, such as, mobile computers (e.g., laptops, ultrabooks), desktop computers, mobile phones, smart phones, tablets, personal display devices, personal digital assistants ("PDAs"), gaming consoles and/or devices, smart vehicles (e.g., cars, trucks, motorcycles, etc.), and/or wearable devices (e.g., watches, pins/broaches, headphones, etc.), to name a few, may take some action (e.g., visit a website, download an application, purchase a product, etc.) related to the product or service promoted in the digital advertisement being displayed on non-personal digital device 10. As shown in FIG. 2, the one or more personal electronic devices 21-1 . . . 21-$m$ are observed personal electronic devices and the one or more personal electronic devices 22-1 . . . 22-$n$ are a sub-set of the observed personal electronic devices 21-1 . . . 21-$m$ on which some action (either in a response to a call-to-action in a digital advertisement or otherwise) is performed related to the product and/or service of the displayed digital advertisement.

In accordance with exemplary embodiments, some such actions may be tracked by using a unique response channel (a.k.a. "call-to-action" or "CTA") embedded within a digital advertisement displayed at the non-personal digital device 10. A CTA may include one or more of: a coupon code, a QR code, unique URL address, a unique call-tracking telephone number, a unique SMS short code, a unique social media hashtag, and/or a unique email address, to name a few. However, a response to a call-to-action is not necessary in order for the present invention to enable attribution. For example, in other embodiments the digital ad buying system 50 may be provided with specific information so as to enable the digital ad buying system 50 and/or the integrated measurement platform 40 to perform post-view attribution, in which some other event (e.g., an action that is not a direct response to a call-to-action in the digital advertisement) performed on a personal electronic device that is attributed to an impression record sent by the programmatic module 1. Such other event may include, for example, a visit to a web-site associated with the displayed digital advertisement, an online or offline purchase of the advertised product or service, downloading of an app featured in the digital advertisement, or performance of some other action on the personal electronic device that is associated with the displayed digital advertisement.

In exemplary embodiments, one or more of the personal electronic devices 21-1 . . . 21-$m$ may include a dedicated software application, or a Software Development Kit ("SDK") may be provided to other applications, for supporting the ability to handle requests to a pre-determined URL link (e.g., "link.to" or "shortlink.com") associated with a call-to-action. In exemplary embodiments, the pre-determined URL link may be displayed directly within the digital advertising creative, or the link may be delivered to the personal electronic devices 21-1 . . . 21-$m$. The dedicated application or SDK may be registered with URL prefixes corresponding to those populated by the programmatic module 1 into the call-to-action field of the digital advertisement. The dedicated application or SDK may also register with the operating system of one or more personal devices 21-1 . . . 21-$m$ to handle links of the format "link.to" or "shortlink.com" or some other predetermined URL and to retrieve device-specific advertising identifiers (e.g., IDFA or AAID). In exemplary embodiments, if a consumer performs an action on a mobile device that has the dedicated application (or an application installed with the SDK), before redirecting the mobile device browser to the final destination site, the device's advertising identifier is looked up and recorded. The recorded advertising identifier may be combined with call-to-action tracking information, and this may be used to send a tag call to the digital ad buying system 50 and/or integrated measurement platform 40. The tag call in turn may be used by the digital ad buying system 50 to generate a click event (referred to as a "physical click") associated with an observed personal electronic device with the same device-specific advertising identifier. This allows the digital ad buying system 50 or an integrated measurement platform 40 to perform an attribution process where causation of a conversion may be inferred from a physical click or some other action performed by the consumer after an impression in direct response to the digital advertisement.

In accordance with exemplary embodiments of the present invention, call-to-action events may be tracked by the non-personal digital device 10 first displaying, for example, a unique quick response (QR) code in a digital advertisement. Once the QR code is displayed, the communications service 80 may provide the measurement module 30 with tracking information each time the QR code is scanned. Tracking information, in embodiments, identifies each time a call-to-action event is used (e.g., a QR code is scanned) by one or more personal electronic devices 21-1 . . . 21-$m$ being operated by an individual 20-1 . . . 20-$n$. Tracking information may include information unique to the one or more personal electronic devices 21-1 . . . 21-$n$ scanning the QR code.

After a QR code is scanned by one or more personal electronic devices 22-1 . . . 22-$n$, the QR code may be transformed by software of the one or more personal electronic devices 22-1 . . . 22-$n$ into a web request. The web request may cause the generation of request information. Request information, in embodiments, identifies when a call-to-action event is performed (e.g., a scanned QR code) by one or more personal electronic devices 22-1 . . . 22-$n$. Collecting request information may help associate the event with a previously recorded individual impression (i.e. associated with an actual device-specific advertising identifier) using attributes included in the request information, for example: URL requested, requested IP address, cookies, user-agent, location of request, time of request, source network, and/or other meta data attached to the web request, to name a few. The measurement module 30 may then associate the web request with a previously recorded individual impression and emulate a browser making a click request to the digital ad buying system 50 and/or integrated measurement platform 40 by triggering the click tracker associated with the digital advertising creative and by including the previously recorded individual impression information as parameters or meta-data on the request. Impression information, in embodiments, may include data specific to an impression, including, a time that the impression was displayed, a location at which the impression was displayed, an advertiser associated with the impression, and/or one or more products being advertised with the impression, to name a few. In embodiments, the measurement module 30 may associate the tracking information with a previously recorded individual impression using data within the tracking information. The tracking information includes data that indicates a unique individual impression associated with a time and/or location. Using the tracking information may allow the measurement module 30 to associate one or more personal electronic devices 22-1 . . . **22-*n* (and the individuals 20-1 . . . 20-*n* operating the one or more personal electronic devices 22-1 . . . 22-*n***) with a specific individual impression associated with a time and/or location.

In accordance with exemplary embodiments of the present invention, call-to-action events can be tracked by displaying, for example, a unique coupon code in the digital advertisement and then having the communications service 80 provide the measurement module 30 with tracking information each time the code is submitted to a website, emailed for a transaction, postal mailed, provided on a phone call, entered into an e-commerce transaction, provided during a retail transaction, or other redemption, to name a few. The measurement module 30 will then associate the tracking information with a previously recorded individual impression (i.e. associated with an actual device-specific advertising identifier), and then emulate a browser making a click request to the digital ad buying system 50 and/or integrated measurement platform 40 by triggering the click tracker associated with the digital advertising creative and by including the previously recorded individual impression information as parameters or meta-data on the request.

In accordance with exemplary embodiments of the present invention, call-to-action events can be tracked by, for example, displaying in the digital advertisement a custom URL, which can track and redirect the personal electronic device to an advertiser URL. In such an embodiment, the process of redirecting from a human-readable short format (e.g., link.to/advertiser) can be used to determine the event was triggered, and collect request information to help associate the event with a previously recorded impression. The measurement module 30 will then associate the request information with a previously delivered individual impression (e.g., associated with an actual device-specific advertising identifier), and then emulate a browser making a click request to the digital ad buying system 50 and/or integrated measurement platform 40 by triggering the click tracker associated with the digital advertising creative and by including the previously recorded individual impression information as parameters or meta-data on the request.

In accordance with exemplary embodiments of the present invention, call-to-action events can be tracked by displaying a unique call-tracking telephone number in the digital advertisement and then having a communications service 80 provide the measurement module 30 with tracking information each time a call is received at the call-tracking telephone number. The measurement module 30 will then associate the tracking information with a previously delivered individual impression (e.g., associated with an actual device-specific advertising identifier), and then emulate a browser making a click request to the digital ad buying system 50 and/or integrated measurement platform 40 by triggering the click tracker associated with the digital advertising creative and by including the previously recorded individual impression information as parameters or meta-data on the request. Additional information, such as, for example, referring number, call duration, automated menu selections, call quality score, or other campaign specific information, to name a few, may also be collected.

In accordance with exemplary embodiments of the present invention, call-to-action events can be tracked by displaying a unique SMS number or short code in the digital advertisement and then having the communications service 80 provide the measurement module 30 with tracking information each time an SMS message is received using the number or short code associated with the digital advertisement. The measurement module 30 will then associate the tracking information with a previously delivered individual impression (e.g., associated with an actual device-specific advertising identifier), and then emulate a browser making a click request to the digital ad buying system 50 and/or integrated measurement platform 40 by triggering the click tracker associated with the digital advertising creative and by including the previously recorded individual impression information as parameters or meta-data on the request. In embodiments, other forms of messaging such as MMS, or messenger apps can be used in lieu of SMS message. Additional information, such as, for example, per-campaign keywords or other campaign specific information may also be collected.

In accordance with exemplary embodiments of the present invention, call-to-action events can be tracked by displaying a unique social media hashtag (e.g., #promoteadvertisercampaign) in the digital advertisement and then having the communications service 80 provide the measurement module 30 with tracking information each time the hashtag is posted in social media. The measurement module 30 will then associate the tracking information with a previously delivered individual impression (e.g., associated with an actual device-specific advertising identifier), and then emulate a browser making a click request to the digital ad buying system 50 and/or integrated measurement platform 40 by triggering the click tracker associated with the digital advertising creative and by including the previously recorded individual impression information as parameters or meta-data on the request. Exemplary social media systems include Facebook®, Instagram®, Twitter®, Snapchat®, and/or LinkedIn®, to name a few. Additional information such as, for example, social media profile usernames, post engagement activity (e.g., likes, shares, etc.) or other campaign specific information may also be collected.

In accordance with exemplary embodiments of the present invention, call-to-action events can be tracked by displaying a unique email address in the digital advertisement and then having the communications service 80 provide the measurement module 30 with tracking information each time such email address receives an email associated with the digital advertisement. The measurement module 30 will then associate the tracking information with a previously delivered individual impression (e.g., associated with an actual device-specific advertising identifier), and then emulate a browser making a click request to the digital ad buying system 50 and/or integrated measurement platform 40 by triggering the click tracker associated with the digital advertising creative and by including the previously recorded individual impression information as parameters or meta-data on the request. Additional information, such as, for example, email address, subject line, or other campaign specific information may also be collected.

In accordance with exemplary embodiments of the present invention, call-to-action events can be tracked using other information that can be used to link the event to a previously recorded individual impression (e.g., associated with an actual device-specific advertising identifier). Such other information may include, for example, date of the call-to-action, time of the call-to-action, a digital advertising campaign associated with the call-to-action and a keyword associated with the call-to-action, to name a few.

In exemplary embodiments, the bidding module 60 is connected either directly or indirectly through a network (e.g., the Internet) to a data collection module 90. The data collection module 90 may be configured to collect observation data associated with the one or more personal electronic devices 21-1 ... 21-$m$, 22-1 ... 22-$n$. The observation data may include a device-specific advertising identifier that includes at least one of mobile advertising IDs (e.g., IDFAs, Android IDs, to name a few), browser cookies, or e-mail addresses or hashed equivalents, to name a few. The observation data may further include location data, such as, for example, latitude/longitude, Geohash, or other positional coordinates collected from the device signals, to name a few. In this regard, the data collection module 90 may be connected either directly or indirectly through a network (e.g., the Internet) to a data provider 100 that provides some or all of the observation data in the form of, for example, real-time network usage data, sensor-collected sightings, application-derived user location data, or purchased third-party location data, to name a few. The observation data may further include a timestamp that indicates the exact time the observation occurred.

Figure 3B:
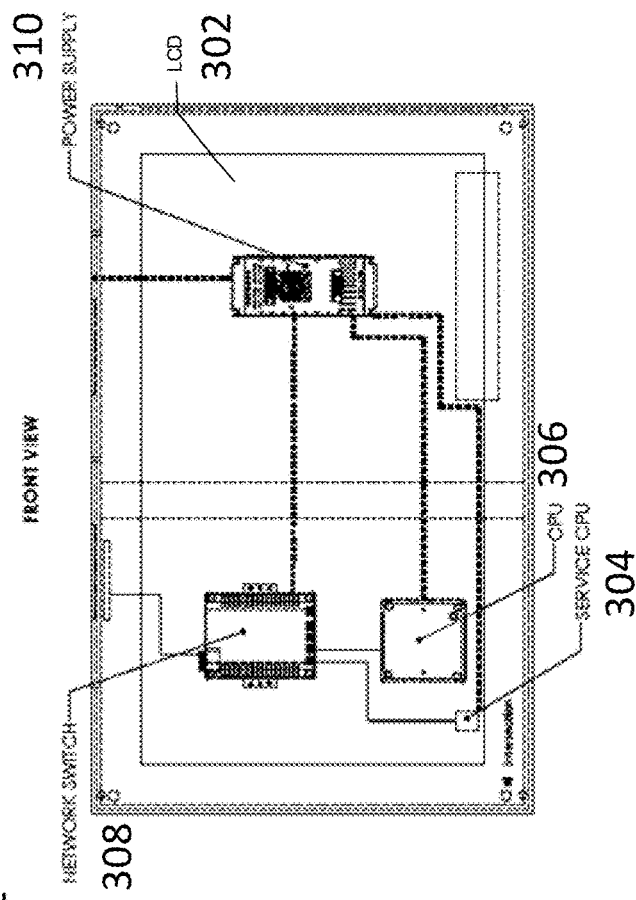
FIGS. 3A, 3B, and 3C show front, cross-section, and top views respectively of an exemplary electronic display system for a non-personal digital device in a public or semi-public setting in accordance with exemplary embodiments of the present invention.
Figure 3A:
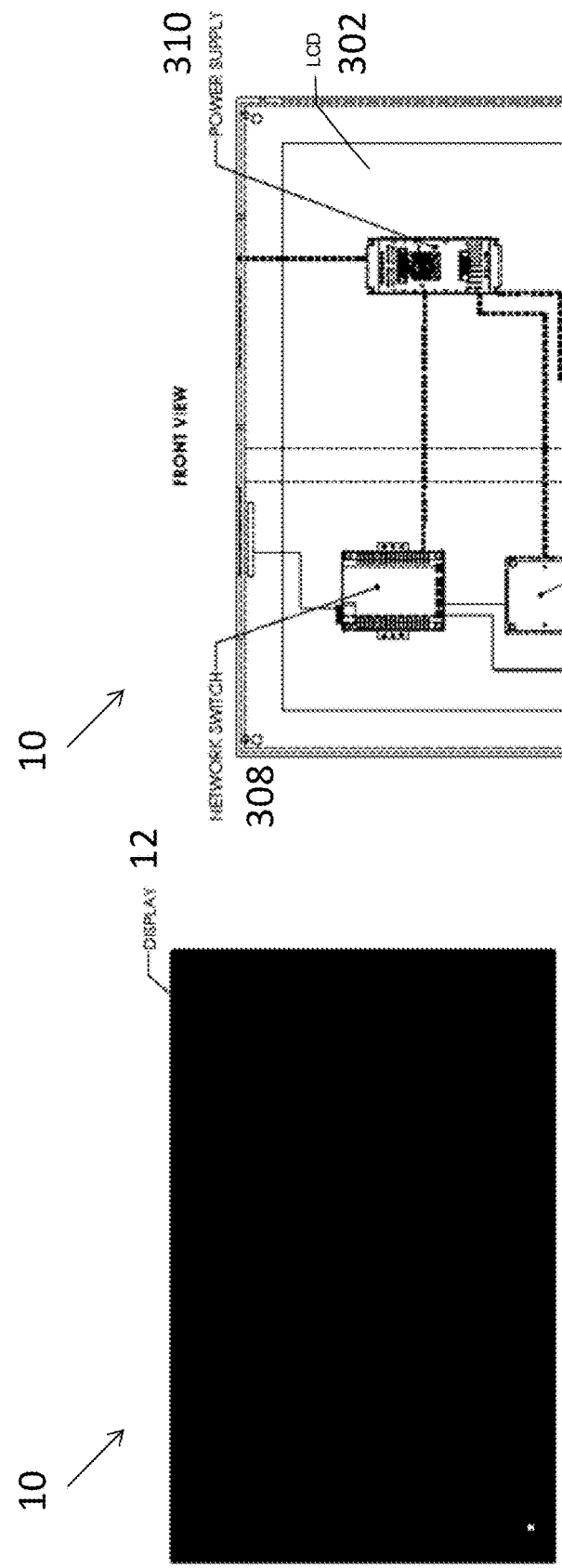
Figure 3C:
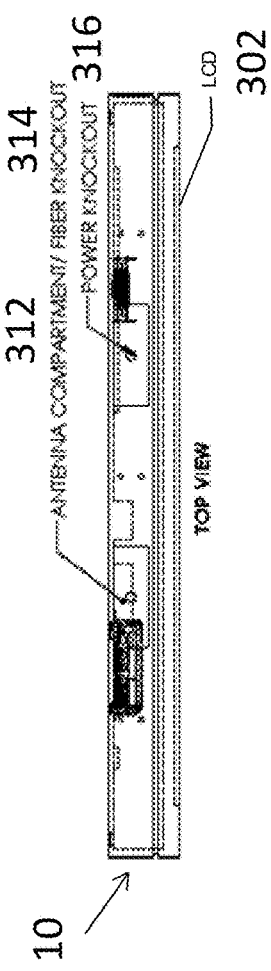

FIGS. 3A, 3B, and 3C show front, cross section, and top views, respectively, of an exemplary non-personal digital device 10 that can be used in accordance with exemplary embodiments of the present invention. As illustrated in FIGS. 3A-3C, non-personal digital device 10 includes a monitor 12 electrically connected to LCD 302 (liquid crystal display) on which the digital advertisement may be displayed. The LCD 302, is used in an exemplary manner, and other types of display circuitry may be used, for example, cathode ray tube (CRT), light emitting diodes (LED), e-paper and organic light emitting diodes (OLED), to name a few. In embodiments, monitor 12 may be a touch screen, allowing one or more individuals 20-1, 20-2 ... 20-$n$ to interact with the non-personal digital device 10. Monitor 12, in embodiments, may include a resistive touch screen, a capacitive touch screen, a surface acoustic wave touch screen, an infrared touch screen, an optical imaging touch screen, or an acoustic pulse recognition touch screen, to name a few.

The non-personal digital device 10 may also include a network connection, such as network switch 308, antenna (which may be located in the antenna compartment 312 and/or accessible via the fiber knockout 314) as shown in FIGS. 3B and 3C, by way of example. Other types of network connections such as cellular modems using GPRS, EDGE, 3G, 4G LTE, low power LTE, Ethernet, token-ring, Wi-Fi, WiMAX, Bluetooth®, ZigBee, fixed-point wireless, mesh networks, GSM, GSM-R, UMTS, TD-LTE, LTE, LTE-Advanced Pro, LTE Advanced, Gigabit LTE, CDMA, iDEN, MVNO, MVNE, Satellite, TETRA, WiMAX, AMPS TDMA, Roaming SIM, DC-HSPA, HSPA, HSPA+, HSDPA, G, 2G, 3.5G, 4G, 4.5G, 5G, 5.5G, 6G, 6.5G, GNSS, EV-DO, 1×RTT, WCDMA, TDS-CDMA, CDMA2000, CSFB, FDMA, OFDMA, PDMA, AMPS, EV-DO, DECT, IS-95, NMT, UMTS, MPLS, MOCA, Broadband over Power Lines, NB-IoT, enhanced MTC (eMTC), LTE-WLAN, ISDN, Microwave, Long Range Wifi, Point to Point Wifi, EC-GSM-IoT, LTE-M, NB-IoT, Evolved Multicast Broadcast Multimedia Service (eMBMS) and LTE-Broadcast (LTE-B), or other data transmission technologies, to name a few, may also be used in accordance with exemplary embodiments of the present invention.

In exemplary embodiments, the non-personal digital device 10 may offer other features such as an interactive screen or a display of non-advertising information, to name a few. In embodiments where the non-personal digital device 10 includes a touch screen, tablet or other consumer-operated interactive capability, an event can also be tracked and linked to an individual impression when a consumer takes some action (e.g., purchasing a product) via an interactive capability on the non-personal digital device 10 and the non-personal digital device 10 sends a message to the measurement module 30 registering the event.

By way of example, the non-personal digital device 10 may further include, service CPU 304, CPU 306, and power supply 310. The service CPU 304 may allow an individual or the non-personal digital device 10 manufacturer to fix or troubleshoot the non-personal digital device 10. The CPU 306 may include an operating system or other software that provides executable display instructions to the operatively connected LCD 302. The service CPU 304 and CPU 306 may include: one or more processors, memory circuitry (including RAM and/or ROM), a display (which may be similar to LCD 302), communications circuitry, input circuitry, and/or output circuitry, to name a few. The components of the non-personal digital device 10 (e.g., monitor 12, network switch 302, service CPU 304, CPU 306, etc.) may be electronically and/or operatively connected to the power supply 310 (which may be accessible via the fiber knockout 316).

Figure 4:
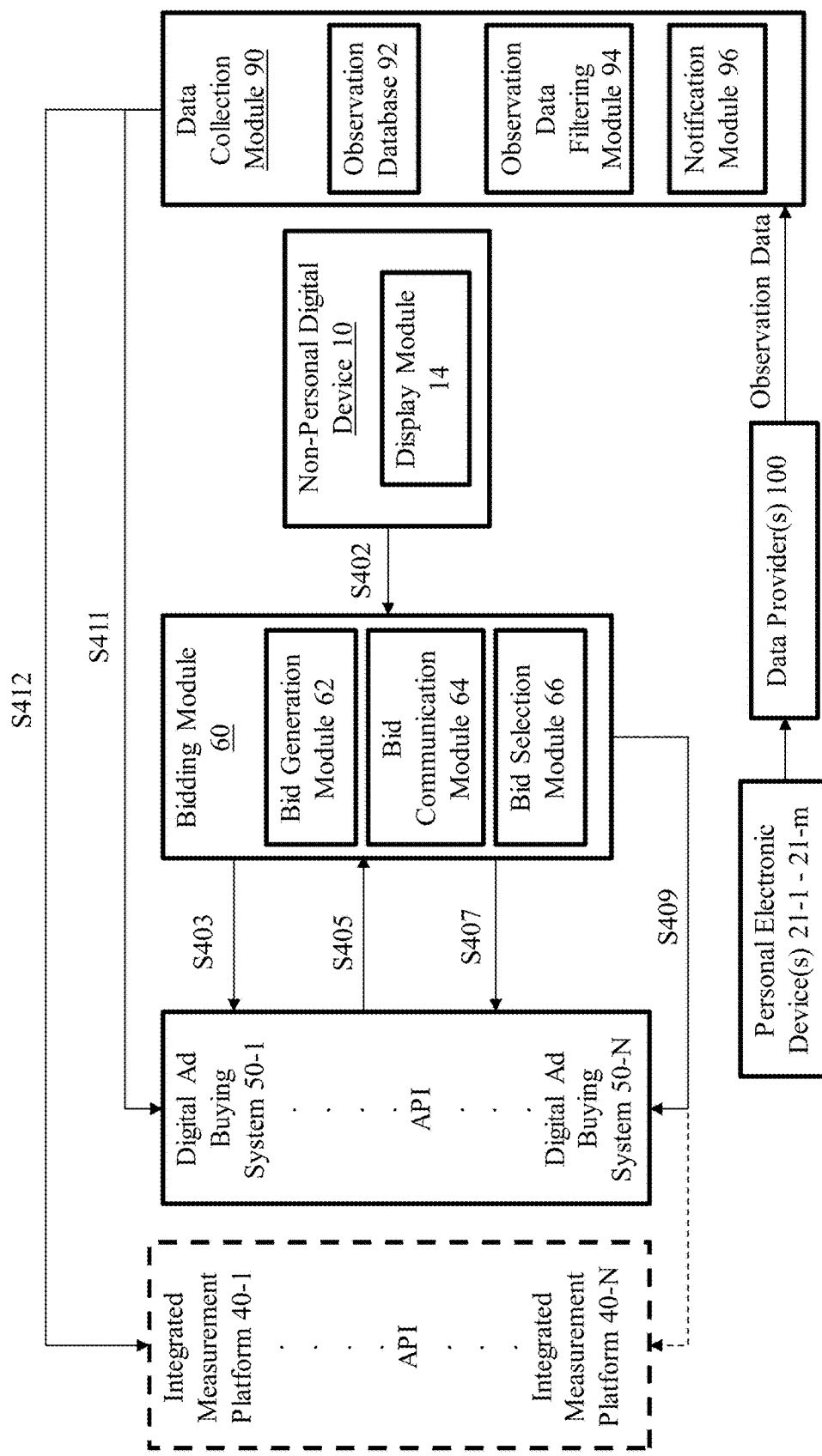
FIG. 4 illustrates a conceptual flow in accordance with exemplary embodiments of the present invention.

FIG. 4 illustrates a conceptual flow in accordance with exemplary embodiments of the present invention. In particular, FIG. 4 illustrates an exemplary process flow in accordance with exemplary embodiments of the present invention, involving digital ad buying systems 50-1-50-N, integrated measurement platforms 40-1-40-N, bidding module 60, non-personal digital device(s) 10, data collection module 90 and/or personal electronic devices 21-1 ... 21-$m$, 22-1 ... 22-$n$, to name a few. Exemplary interaction among these devices will now be discussed.

In accordance with exemplary embodiments of the present invention, the process begins with a step S402, where the bidding module 60 receives, from a non-personal digital device 10, an indication of the availability of an advertisement display opportunity (e.g., an "ad slot") on non-personal digital device 10 for a digital advertisement. The indication of availability, in embodiments, may include advertisement slot information. Advertisement slot information may include, for example, the location of the non-personal digital device 10 and/or the time slot available for an advertisement to be displayed on the non-personal digital device 10. For purposes of illustration, the process will be described assuming a single non-personal digital device (e.g., non-personal digital device 10), but it can be readily appreciated by those skilled in the art, that the same process may work with the same digital advertisement or other digital advertisements being displayed on a plurality of non-personal digital devices, associated with the same or different owners or operators.

The bidding module 60, in step S403, may then call for bids from one or more (N) digital ad buying systems 50-1-50-N. In this regard, the bidding module 60 may include a bid generator module 62 which may be configured to perform one or more of the following operations: (i) estimate the projected number of consumers who may be exposed to an advertisement, and use that estimated number to generate an "impression estimate" (X); and (ii) generate one or more (Y) bid requests in the appropriate format for each of the N digital ad buying systems. The estimation of the projected number of consumers may be obtained based on data from rating agencies (e.g., Geopath®, Nielsen®, and/or Route®, to name a few), network connections, proprietary sensors, analysis of camera or other sensor data, observation data, and/or mobile applications, to name a few. In an exemplary embodiment, an estimate of a number of impressions may be obtained in accordance with a process where data is combined, including (i) selecting the most accurate estimate for a particular non-personal digital device 10, and (ii) adjusting this most accurate estimate to account for situational factors including but not limited to time of day, day of week, seasonality and/or observational data skew, with the ability to configure and toggle both inputs to the adjustment process, as well as which sources/factors are considered for adjustment.

The bidding module 60 may adapt the non-personal digital device 10 to bid and/or display one or more digital advertising formats. In this regard, the bid generator module 62 may include computer code associated with instructions for one or more processors to identify the capabilities of the calling non-personal digital device, where such capabilities may relate to, for example, screen resolution, display size, video support, computational capacity, audio capabilities, and/or zoning restrictions, to name a few. In this regard, the bid generator module 62 may generate and/or display a graphical user interface that enables input of capability parameters associated with the calling non-personal digital device and/or may include a detection algorithm configured to automatically detect the capability parameters (e.g., by obtaining feedback from test creatives played at the calling non-personal digital device). The bid generator module 62 may then translate the list of display capabilities into the list of digital formats that can be successfully displayed given the capabilities of the non-personal digital device 10 (e.g., custom ad units, IAB standard ad units (e.g., 728×90, 300×250, etc.), VAST video, device representations (e.g., browser/mobile OS, audio and video support, etc.), and/or website/app identifiers (domain URL, mobile app store ID, etc.), to name a few). This translation may be performed either through direct transformation or through composition with other elements (e.g., visible elements of the digital advertisement creative, dynamic content, etc.). The list of available digital formats is then cross-referenced against the digital formats supported by each of the N digital ad buying systems 50-1-50-N. The combined list of digital formats is used to generate the Y bid requests sent to each of the N digital ad buying systems 50-1-50-N. A creative received from an buying system on behalf of a winning advertiser may be adapted by making appropriate changes to the display characteristics, such as, for example, sizing, resolution, color palette, frame rate, and sampling rate, to name a few, and/or by adding content overlaid, adjacent-to and/or surrounding the advertisement to match the size and aspect ratio of the non-personal digital device 10.

Examples of "custom ad units" or device-specific ad unit formats may include non-IAB standard dimensions that may be more common on non-personal digital devices, such as 1024×768, 1920×1080, 1080×1920, 720×1280, and 3840×2160, to name a few. Other format details may include, for example, aspect ratio and/or diagonal size of the non-personal digital device.

Examples of IAB standard ad units include those that have been outlined by the Interactive Advertising Bureau (IAB) in their Display & Mobile Advertising Creative Format Guidelines. Specific examples include medium rectangle (300×250), wide skyscrape (160×600), leaderboard (728×90), and half page (300×600), to name a few.

VAST video is the digital Video Ad Serving Template (VAST), another IAB standard specification that details the transmission of video advertising along with tracking instructions to measure completion rates and interaction with either the video or the video player.

Examples of device representations include operating system (e.g. Windows, Chrome, Android, iOS, etc.), browser (e.g. Internet Explorer, Chrome, Safari), and corresponding build and version numbers. Device representation may also include details regarding enabled or disabled attributes of the digital devices, such as audio and video or specific supported file formats (e.g., .wav, .mp3, .mp4, Adobe Flash, .png, .gif, .jpg), to name a few.

Examples of website/application identifiers include domain URLs, IAB category IDs, mobile application store app IDs, and/or mobile application build or version numbers, to name a few.

The bid communication module 64 of the bidding module 60 may be configured to send to each of the N digital ad buying systems 50-1-50-n Y bid requests, with each of the Y bid requests including the impression estimate X. Each of the Y bid requests may further include a single proxy-ID as a virtual identifier associated with one or more non-personal digital devices (e.g., non-personal digital device 10) potentially viewed by a unique group of consumers to allow the digital ad buying systems 50-1-50-n to perform frequency capping and prevent over-exposure of that group of consumers to a particular digital advertising campaign and/or creative. The bid communication module 64 may send the Y bid requests via a network (e.g., the Internet).

In step S405, the bid communication module 64 may receive bid responses. The bid communication module 64 may be configured to receive from each of the N digital ad buying systems 50-1-50-n, one or more (Z) bids, contained in Y responses to the above Y bid requests (it should be appreciated that "X", "Y" and "Z" as used herein are integers). Each of the Z bids may contain bid information data such as, for example, pricing the digital ad buying system is willing to pay per impression (which will be the same price for all X impressions represented in a given bid response) and digital ad buying system impression data such as unique auction identifiers or impression records to support registering up to X impressions in the digital ad buying system 50. Digital ad buying system information, in embodiments, allows the bidding module 60 to identify the entity bidding for the digital advertisement slot. The digital ad buying system information may include, for example, a name associated with an account of a bidder, a name associated with the bidder, a series of numbers identifying a specific bidder, and/or letters identifying a specific bidder.

The bid selection module 66 of the bidding module 60 may be configured to select from the one or more bid responses (N×Y×Z) a winning bid response, associated with a digital ad buying system, that meets winning bid criteria. Winning bid criteria may include, for example, a highest price bid, campaign pacing, campaign fulfillment thresholds, publisher frequency limits, publisher advertiser whitelists/blacklists, and content relevance, to name a few. In this regard, before applying the winning bid criteria, the bid selection module 66 may filter the bids based on one or more filtering criteria, such as, for example, whether the bid meets minimum pricing requirements, whether the digital advertising creative associated with the bid has been reviewed and approved for display, and/or whether the bid matches any relevant private deals, if applicable.

In step S407, the bidding communication module 64 sends a winning bid notification. The bid communication module 64 may be configured to notify a winner of the auction, adapting the notification to correctly account for multiple individual viewers of the digital advertisement by generating and/or appending placeholder advertising identifiers to each impression notification. This operation may be performed to account for the fact that the winning bid is not associated with a one-to-one bid request-to-bid response ratio, but instead is associated with one winning bid corresponding to more than one impression record (in this case, the X impression estimate). In this regard, the bid communication module 64 may store, from the winning bid contained in an associated digital ad buying system's modified bid response, X sets of digital ad buying impression data provided by the winning digital ad buying system necessary to generate X distinct won impressions after receiving an initial win notification. The bid communication module 64 may be configured to then construct X notifications to communicate the purchased inventory through existing recording mechanisms in the digital ad buying system 50. The X notifications may then be sent by the bid communication module 64 to the winning digital ad buying system's notification Application Program Interface ("API").

After sending notification of a winning bid, in embodiments. the bidding module 60, in step S409, retrieves the digital advertising creative (for example, from an ad server), or an identifier of a previously registered digital advertising creative, for display at the non-personal digital device 10. A digital advertising creative, for example, may be the digital advertisement the winning advertiser chooses to display on the monitor 12 of the non-personal digital device 10. In embodiments, the digital advertising creative may include a call-to-action item embedded within the digital advertisement. The digital advertising creative of the winning advertiser from the winning digital ad buying system may then be electronically displayed at the non-personal digital device 10. In this regard, the non-personal digital device 10 may be configured to format the received digital creative to optimize the size and location of the digital advertising creative on the non-personal digital device 10. Any digital ad buying system or integrated measurement platform tags in the digital advertising creative, such as click trackers, action tags and view tags, may be extracted. The non-personal digital device 10 may be configured to display a consumer-executable call-to-action which can be performed on any one of the personal electronic devices 22-1-22-*n*. Examples of such electronic action items may include a coupon code, a QR code, unique URL address, a unique call-tracking telephone number, a unique SMS short code, a unique social media hashtag, a unique email address, to name a few. Appropriate design elements or content may be combined with the digital advertisement creative on the non-personal digital device 10 to form a complete user experience.

In exemplary embodiments, the platform 1 may be configured to render pixels associated with a digital advertisement creative prior to transmitting to the non-personal digital device 10 (as opposed to the non-personal digital device 10 itself rendering the pixels). This allows for implementation of an "override" process that allows operators of the system (e.g., Advertising Operations groups) to choose to use a dynamic digital advertisement (e.g., JavaScript) after undergoing a review process, which can involve, for example, automatic code analysis, security scan-type heuristics, and/or manual inspection/review of code, to name a few.

As illustrated by the timing diagram shown in FIGS. 6A-6F (to be explained in further detail below), in exemplary embodiments, "Ad Slots" may be electronically analyzed to determine which digital ad formats can be satisfied by the capability of the non-personal digital device 10. For each of the X digital ad buying systems 50-1-50-N (as shown in FIG. 4), these opportunities will then be translated into Y "BidRequests" for each format a digital ad buying system is capable of consuming. Each digital ad buying system returns one or more responses for each format. Responses are gathered together and then filtered against any restrictions, such as, for example publisher restrictions, pricing restrictions, content restrictions, legal restrictions and industry restrictions, to name a few, and a winning bid is selected, for example, based on the highest price bid. The digital advertising creative associated with the winning bid is returned to the display 12, and the number of winning notifications ("Win Notification 1, Win Notification 2, and Win Notification 3" in FIG. 6E) associated with the impression estimate ("imp_x" in FIGS. 6A-6F) for that Ad Slot is sent to the winning digital ad buying system 50. For example, since the impression estimate is three ("imp_x=3") in the example shown in FIG. 6E, three win notifications are sent out to map to budgeting and pacing concepts of the winning digital ad buying system 50.

Referring back to FIG. 4, in accordance with exemplary embodiments, digital advertising plays on non-personal digital devices are translated into "impressions" associated with device-specific advertising identifiers, thereby enabling advertising operations such as, for example, same-device attribution, cross-device attribution, reach and/or frequency analysis, audience analytics, performance optimization, and/or forecasting, to name a few. In this regard, the data collection module 90 may be configured to collect observation data that may include data associated with one or more personal electronic devices 21-1 . . . 21-*m*, 22-1 . . . 22-*n* and/or store the aforementioned observation data in a database 92. The observation data may include, for example: (i) a device-specific advertising identifier (such as mobile advertising IDs (e.g., IDFAs, Android IDs), browser cookies, and/or e-mail addresses or hashed equivalents, to name a few); (ii) location information represented as latitude/longitude, Geohash, and/or other positional coordinates collected from device signals, (e.g., real-time network usage data, sensor-collected sightings, application-derived user location data, and/or purchased 3rd-party location data, to name a few), to name a few; and/or (iii) a timestamp indicating a time the observation occurred. Some or all of the observation data may be obtained from one or more data provider(s) 100, which may include, for example, a cell phone service provider, a mobile application publisher, and/or some other third-party system that provides such data, to name a few.

In embodiments, the observation data filtering module 94 of the data collection module 90 may be configured to filter the observation data to determine the "actionable" observations corresponding to viewers who were within a viewing geometry of the non-personal digital device 10 during a time in which the advertisement was displayed by the non-personal digital device 10. This filtering process may filter out "unactionable" observations corresponding to individuals who were not within a viewing geometry of the non-personal digital device 10 during a time in which the advertisement was displayed by the non-personal digital device 10.

At step S411, the notification module 96 of the data collection module 90 may send a notification of billable impressions to the winning bidder (e.g., one of the digital ad buying systems 50-1-50-N). The notification module 96 of the data collection module 90 may be configured to notify the winning digital ad buying system of the billable impressions. In this regard, the notification module 96 may be configured to substitute each of the placeholder advertising identifiers that were communicated in the won impression notification at auction time to the winning digital ad buying system, with a corresponding one of the one or more collected actual device-specific advertising identifiers obtained from the actionable observations, corresponding to one or more personal electronic devices 22-1-22-$m$ owned by and/or associated with viewers of the digital advertisement. This substitution enables the digital ad buying system 50, and/or integrated measurement platform 40, to perform attribution of the impression to subsequent actions taken by that viewer (such as visiting a website, downloading an app, and/or purchasing a product, to name a few). This substitution may occur in real-time (e.g., within a predetermined number of seconds, within a predetermined number of milliseconds, etc.) or may occur on a configurable time lag (e.g., a predetermined amount of time). In the event that the digital advertisement creative includes additional tracking associated with the optional integrated measurement platform 40, in step S412, in embodiments, the notification module 96 of the data collection module 90 may send the same notifications with one or more collected actual device-specific advertising identifiers to the integrated measurement platform 40 to enable attribution of the impression to subsequent actions taken by that viewer. This substitution may occur in real-time, on a configurable time lag, and/or as a batch communication on a configurable time lag (as shown in connection with FIG. 6I).

In exemplary embodiments, the bidding module 60 may be configured to support ingestion and/or normalization of one or more various observations. For example, the bidding module 60 may include an application programming interface (API) that is configured to allow for collection of data in various formats from various types of data providers. The bidding module 60 may be configured to normalize the observation data into a standardized format and/or eliminate invalid data, which may include, for example, data provided in an invalid format (e.g., missing advertising identifiers, location information, and/or other essential fields, to name a few), data provided after expiration of a published expiration window (e.g., a predetermined amount of time), data provided with insufficient fidelity or accuracy (e.g., horizontal and/or vertical accuracy), data provided which was likely interpolated from a lower-resolution data-source (e.g., DMA, zip-code, city, and/or region location), data provided which exhibits irregularities in distribution (e.g., overly uniform distributions, repeated values in non-high-population spots, and/or values whose path of travel would indicate an excessive speed), and/or duplicated data, to name a few.

In exemplary embodiments, the bidding module 60 may be configured to allow digital ad buying systems 50-1-50-N to perform frequency capping and/or prevent over-exposure of viewers to a particular digital advertising campaigns and/or digital advertising creatives. In this regard, the bidding module 60 may be configured to create a proxy-ID associated with one or more non-personal digital devices potentially viewed by a unique group of consumers, send that proxy-ID as a virtual identifier on each bid request, and rotate the proxy-ID over time. In embodiments, the proxy-ID may be rotated periodically at configurable time intervals and/or may be rotated based on data indicating that the audience has changed (e.g., observed personal electronic device data and/or computer vision analysis data). Specifically, if the digital ad buying system 50-1-50-N detects the same proxy-ID in a bid request as that provided in a previously won auction, the digital ad buying system may choose to not respond to the bid request and/or limit their responses to ensure that the same group of consumers are not exposed to the same digital advertising campaign and/or digital advertising creative.

In exemplary embodiments, the bidding module 60 may be configured to protect user privacy by separating communication of device-specific advertising identifiers from the bidding process, and/or only convey device-specific advertising identifiers to the winning bidder after the auction is complete. In embodiments, personal electronic device advertising identifiers may not be sent in the initial bid request. Potential bidders in the auction, in embodiments, may instead be sent a single proxy-ID in the bid requests, which may allow for frequency capping and/or prevent the targeting of digital advertisements to specific consumers on the basis of their actual personal electronic device advertising identifier and/or information known to be associated with that device identifier (a practice known as "personalized advertising" "interest based advertising" or "retargeting"), and prevents other auction participants (besides the winning digital ad buying system 50 and corresponding advertiser) from gaining access to the device-specific advertising identifiers associated with exposed consumers. In exemplary embodiments, information known to be associated with device-specific advertising identifiers may include, for example, demographic data (e.g., gender, age, education, income, etc.), website browsing history, mobile application usage, location-history, financial credit activity, and online shopping activity, to name a few.

In exemplary embodiments, the bidding module 60 may be configured to allow publishers (e.g., an operator of non-personal digital device 10) to ensure digital advertising creatives are reviewed prior to display, and/or to prevent alterations of the digital advertising creatives after review. In this regard, the bidding module 60 may ensure digital ad buying system bids are valid for the non-personal digital devices of a particular publisher only if bids correspond to digital advertising creatives previously reviewed and approved by such publisher. For example, if a bid contains a digital advertising creative that was previously approved by a given publisher, it may be a "valid" bid and eligible to participate in auction(s) for advertisements on the non-personal digital devices of that publisher. If, continuing the example, a bid contains a creative that was previously rejected by a given publisher, it may be an "invalid" bid and removed from consideration for auction(s) for advertisements on the non-personal digital devices of that publisher. If, continuing the example, a bid contains a digital advertising creative with non-reviewed or unknown status with respect to a given publisher, it may be an "invalid" bid and removed from consideration for auction(s) for advertisements on the non-personal digital devices of that publisher. Exemplary tools to support publisher review of digital advertising creatives and management of queues of digital advertising creatives to review may be configured to: (i) identify non-reviewed creatives by providing an API, allowing digital ad buying systems 50-1-50-N to submit new digital advertising creatives for review, and the inventive system to flag as "invalid" those bids with digital advertising creatives that are non-reviewed or have unknown status to identify digital advertising creatives needing review (either via pre-approval process or directly from bids in real time) by operators of the inventive system and/or publisher administrators; (ii) prevent external parties from changing creatives post review by "rasterizing" the digital advertisement creative markup (e.g., HTML, Flash or other dynamic content) into image or video representations at the time of review (including the insertion of a call-to-action); (iii) support dynamic content (e.g., executable code) by allowing automated review of code for security, dependencies, function and intent, allowing operators of the inventive system to extract and control a specific version of a dynamic digital advertising creative to approve its use and display; (iv) support publisher administrators to review the subsequent "rasterization" of the digital advertising creative for subjective and objective criteria (e.g., accuracy of meta-data (e.g., subject matter, brand references, size, etc.), visual quality (alignment, color-balance, text sharpness, visual artifacts, frame-rate, etc.), compliance with content guidelines (e.g., images, motion, text, nudity, alcohol or drug references, etc.), compliance with technical capabilities, identification of "clickthrough" or landing-page content from the original digital advertising creative, to name a few. The bidding module 60 may include an API configured to communicate an approval status to one or more digital ad buying systems 50-1 ... 50-N.

In exemplary embodiments, the bidding module 60 may be configured to include adaptations to allow for continued operation of embedded ad tags in digital advertising creatives, such as impression trackers, click trackers, measurement code, or other ad tags. In this regard, the bidding module 60 may include configurable options to allow for: (i) ignoring embedded tags; (ii) simulating standard device handling of embedded tags; (iii) extracting embedded tags, and storing these for future replay through a "virtual browser" layer emulating a web-browser displaying content (e.g., navigating references in embedded tracking code, to resolve "daisy-chained" or additional tags invoked by the embedded tag); (iv) extracting transaction information from the bid request; (v) building a tracker request by inserting transaction information into the extracted tag; and/or (vi) executing modified embedded tag code from a "virtual browser" or "virtual device" to trigger the recording in third-party systems (e.g., ad servers, integrated measurement platforms, verification platforms, to name a few). For example, in regards to triggering the recording of impressions in third-party systems, such as the advertiser ad server 70, the bidding module 60 may extract tags from the digital advertisement creatives for recording delivery of digital advertisement creatives. For each individual impression determined from the observation data, the bidding module 60 may trigger the extracted tags to create records for each individual impression in third-party systems (e.g., the advertiser ad server 70 and/or the integrated measurement platform 40) in addition to the digital ad buying system 50. In exemplary embodiments, embedded tags may be parsed out of the digital advertising creative returned from the digital ad buying system 50 by analyzing ad metadata (e.g., VAST video files) or applying pattern matching (e.g., prefix matching, regular expressions) against digital advertisement code to identify known ad tags. The extracted ad tags may be triggered one or more times for each of the determined individual impressions. In this regard, the ad tags may be triggered from a "virtual browser environment" populated with equivalent information to the bid response, such as, for example, an IP address reflecting the location of the browser, a user-agent reflecting the type of personal electronic device, and/or custom parameters if the programmatic module 1 allows passing in advertising identifiers and/or other bid information and/or macros. The triggering of ad tags may populate an impression record in the third-party system (e.g., in the integrated measurement platform 40).

In exemplary embodiments, the measurement module 30 may be configured to dynamically link actions performed on personal electronic devices 22-1-22-n in direct response to a call-to-action embedded in the digital advertisements with tracking in the digital ad buying system 50 and/or integrated measurement platform 40. Physical clicks (defined here as call-to-action responses performed by exposed consumers on personal electronic devices) generated by the bidding module 60 may be identified using a timestamp and/or device-specific advertising identifier (e.g., Apple® IDFA, Google® AAID/GAID, Microsoft® MSAID, etc.) or by referencing a previous auction or impression notification linked with a previously collected device-specific advertising identifier. In embodiments, in order to achieve such dynamic linking, the measurement module 30 may be configured to: (i) receive the call-to-action (CTA) from a viewer's personal electronic device when performing the action in question, (ii) retrieve the associated auction information by matching against attributes of the CTA (e.g., device-specific advertising identifier, date/time, location, campaign association, and/or keyword, to name a few), (iii) append the auction identifier and device-specific advertising identifier information to a click-tracker extracted from the digital advertisement, and (iv) map the CTA to the click-tracker (e.g., trigger the tag to ensure tracking of the "physical click" action by the digital ad buying system 50). Click events may be translated into a format to fit existing measurement APIs for digital ad buying systems 50-1-50-N or integrated measurement platforms 40, using a variety of techniques including, but not limited to: (i) emulating web browser devices to create "virtual sessions"; (ii) emulating mobile application advertising SDKs; and/or (iii) formatting messages to match existing published APIs, to name a few. This would then enable the winning DSP 50 and/or integrated measurement platform 40 to perform post-click attribution.

In exemplary embodiments, the measurement module 30 may be configured to connect impressions delivered on non-personal digital device 10 with tracking by the digital ad buying system 50 and/or the integrated measurement platform 40, with actions taken by consumers exposed to those impressions, independent of whether there is a corresponding physical click. In this regard, impressions generated by the bidding module 60 may be identified using a timestamp, a device-specific advertising identifier (e.g., Apple® IDFA, Google® AAID/GAID, Microsoft® MSAID, etc.), and additional information required to associate that ad exposure with a specific ad campaign or creative (e.g., auction ID, campaign ID, digital advertising creative ID). Impression events (e.g., notifications) may be delivered to the digital ad buying system 50 and/or integrated measurement platform 40 within a timeframe allowing them to be associated with other events (e.g., online and offline conversion events, such as, for example, website landing page visits, conversion funnel completion, newsletter subscriptions, event registrations, shopping cart checkout, and offline purchases, to name a few) recorded by the digital ad buying system 50 and/or integrated measurement platform 40. These steps would allow for the winning digital ad buying system 50 and/or integrated measurement platform 40 to perform post-view attribution.

In exemplary embodiments, the bidding module 60 may be configured to allow for the classification of the digital ad display environment by standard digital classification systems, for example, in cases where digital advertising creatives are displayed in the context of other content, such as weather, time, and/or local information, to name a few. In this regard, URL-based content identification may be achieved by: (i) identifying non-personal digital devices using a standard webpage URL scheme; (ii) mapping the URL scheme to a "proxy-page" containing representative content that can be accessed by automated programs (commonly referred to as "spiders" or "crawlers") to analyze their contents; (iii) populating the "proxy-pages" with content corresponding to characteristics of additional content displayed alongside advertising and/or attributes of the surrounding physical environment; and/or (iv) allowing a content analysis service to use the content provided via proxy-web page to produce a relevant classification, corresponding to standard elements. Mobile application content identification may be achieved by: (i) identifying non-personal digital devices using a standard application identifier; (ii) creating a "virtual container" for rendering of mobile device targeted ad formats; and/or (iii) creating an API to emulate the information retrievable from a mobile application around canvas, size, viewable areas, user interactions, to name a few.

In exemplary embodiments, the bidding module 60 may also be configured to allow for the classification of the non-personal digital devices by novel classification systems (for example, that classify on the basis of the physical surroundings of the non-personal digital device). Novel classification systems may include (i) categorizing non-personal digital devices into location-informed physical contextual categories, (ii) mapping non-personal digital devices to audience segments (e.g., demographic, behavioral, intent-based) that may frequent the locations of the non-personal digital devices, to name a few. Examples of physical contextual categories could include groups of non-personal digital devices located near retail businesses, recreational outdoor locations, and/or office buildings, to name a few. Examples of possible audience segments would include 18-25 year old males, fitness enthusiasts, business travelers, and/or in-market automobile shoppers, to name a few. The bidding module 60 could be configured to include data regarding either physical contextual categories and/or audience segments in bid requests either as new custom parameters and/or as part of a negotiated private deal.

Figure 5A:
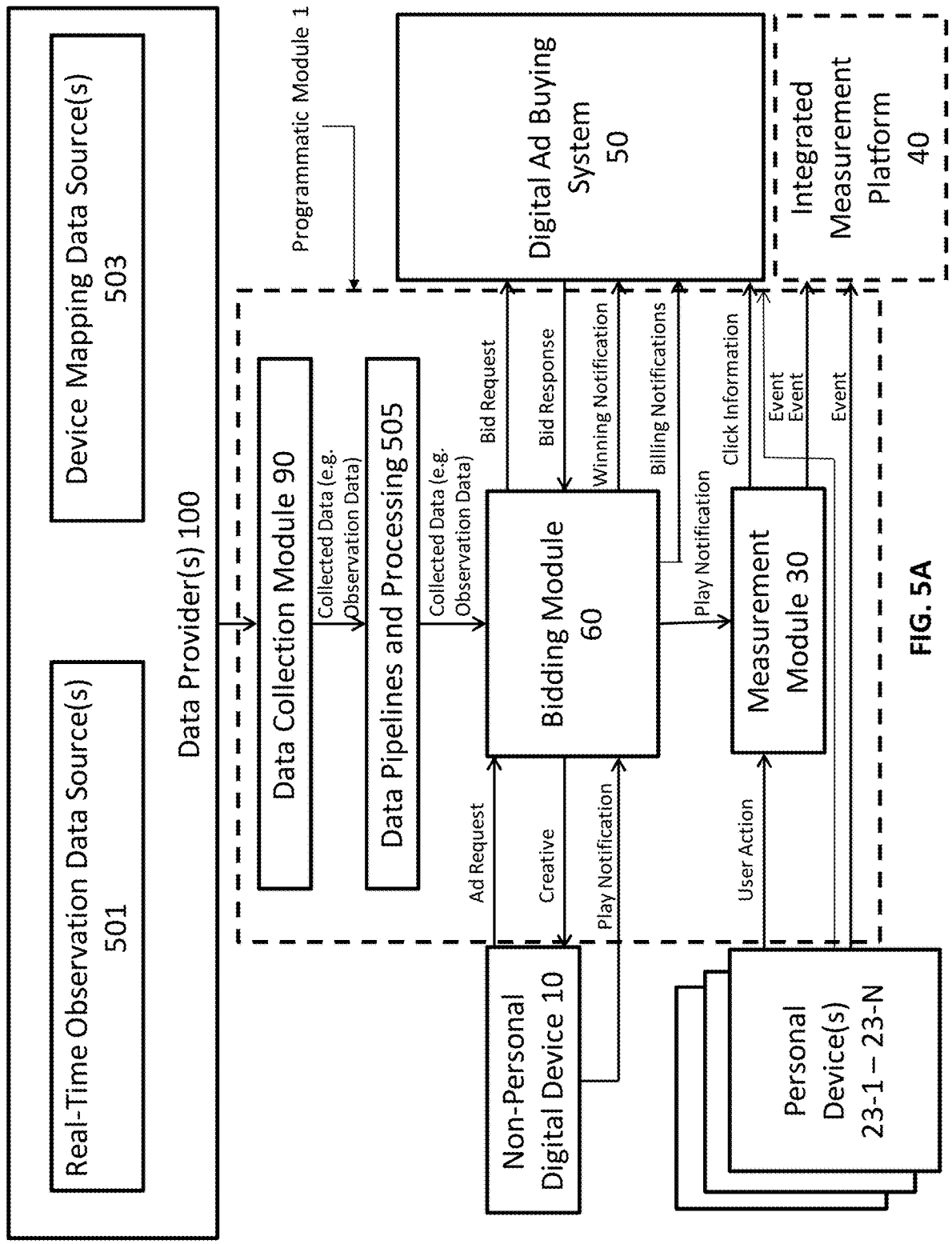
FIGS. 5A-5E are exemplary block diagrams of a system for connecting non-personal digital devices to programmatic ad buying systems in accordance with exemplary embodiments of the present invention.

FIGS. 5A-5E are block diagrams showing interactions between the programmatic module 1 and other components within an operating environment in accordance with exemplary embodiments of the present invention. Referring to FIG. 5A, in exemplary embodiments, the data collection module 90 may be configured to collect data from data provider(s) 100. In embodiments, data provider(s) 100 may include real-time observation data sources 501 and/or device mapping data sources 503, to name a few.

Figure 5B:
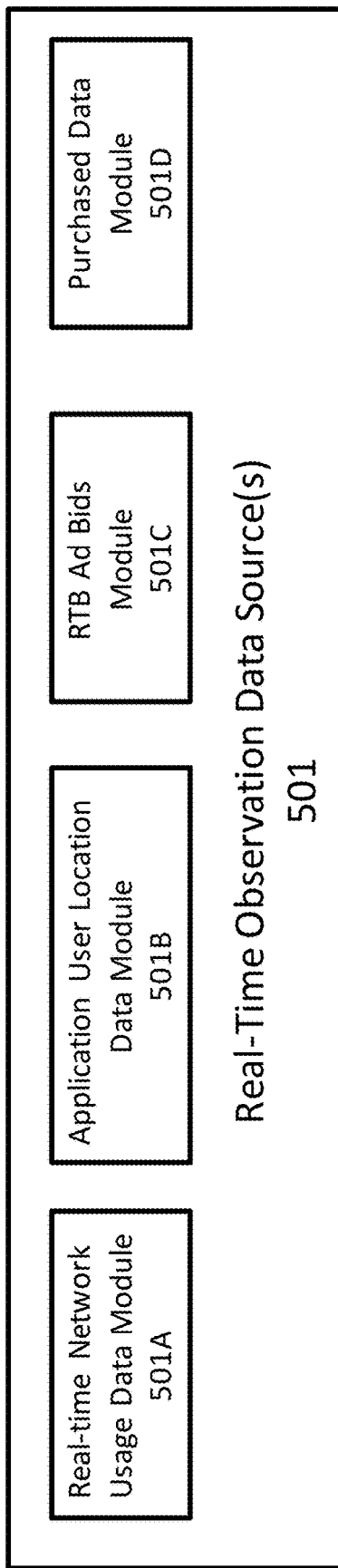

As shown in FIG. 5B, the real-time observation data source(s) 501 may include real-time network usage data module 501A, owned and operated mobile application user location data module 501B, RTB ad bids module 501C, and/or purchased data module 501D, to name a few. Collectively or individually, one or more of these modules may obtain real-time observation data from, for example, real-time network usage data, owned and operated mobile application user location data, RTB bid requests, purchased data, mobile apps, carrier data, and WiFi data, to name a few.

Figure 5C:
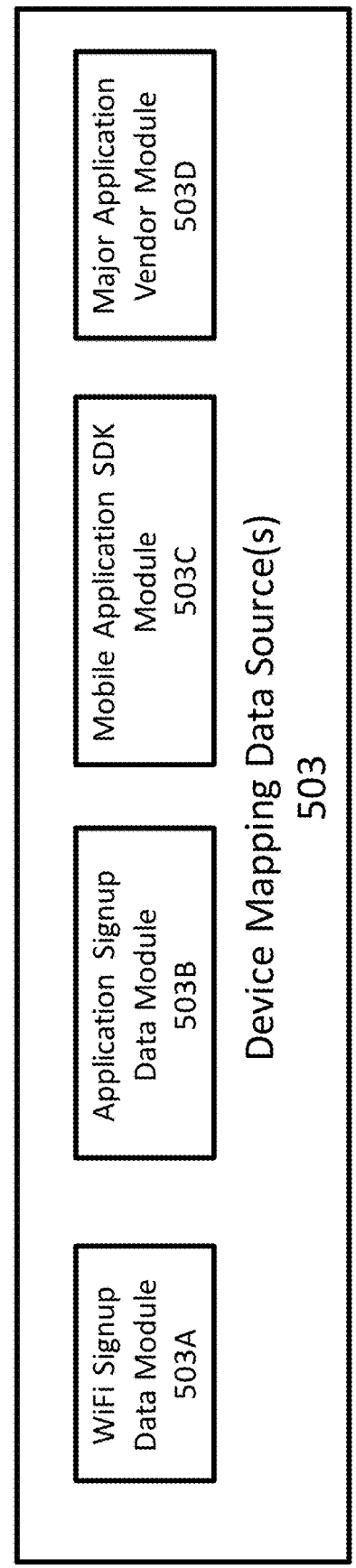

As shown in FIG. 5C, real-time observation data may also be inferred from combining data sets indicating device location with "device mapping data" translating other identifiers (e.g., sessions, broadcast ids, etc.) to personal electronic device advertising identifiers. The device mapping data provided by the device mapping data source(s) 503 may be obtained from, for example, WiFi signup data via the WiFi signup data module 503A, owned and operated mobile application signup data via the application signup data module 503B, application SDKs via the mobile application SDK module 503C, and/or major application vendors (e.g., Foursquare®, etc.) via the major application vendor module 503D, to name a few. Real-time observation data may also be post-processed to cleanse, filter, and/or correct data. Statistical and/or geospatial analysis techniques may also be used to interpolate and/or extrapolate additional observation data points based on the provided observation data.

Figure 5D:
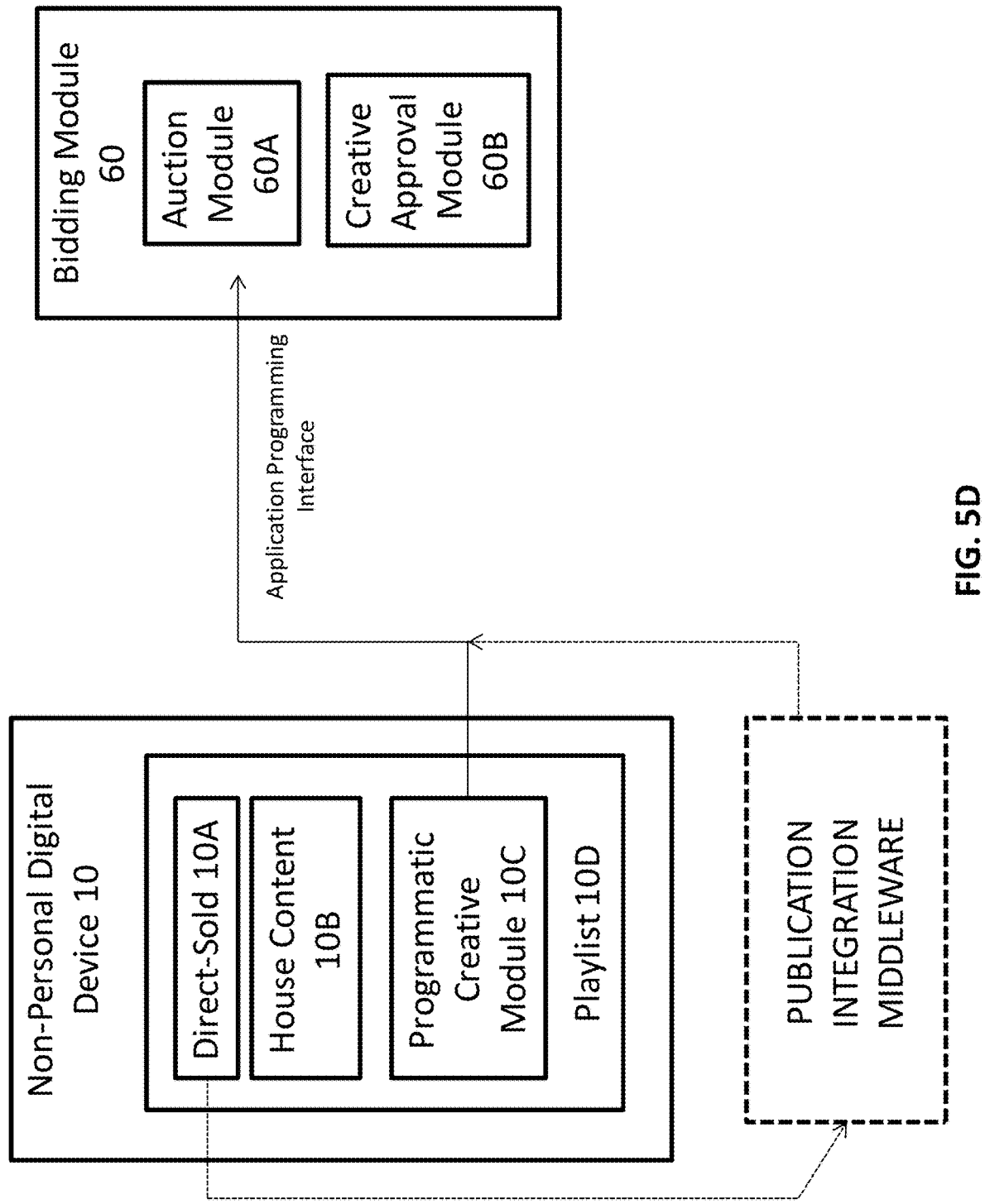

Turning back to FIG. 5A, in exemplary embodiments, the data collection module 90 may be configured to send the collected data through data pipelines and processing 505 to the bidding module 60. In embodiments, the data received by bidding module 60 is considered an observation. Referring to FIG. 5D, bidding module 60 may also be configured to interact with network connected non-personal digital device 10, digital ad buying system 50, and/or measurement module 30, to name a few. Bidding module 60 may further include auction module 60A and creative approval module 60B, to name a few, as shown in FIG. 5D. In embodiments, auction module 60A may send bid requests, winning bid notifications and/or billing notifications to the digital ad buying system 50, and/or receive bid responses from the digital ad buying system 50. In embodiments, creative approval module 60B may obtain digital advertising creatives from the digital ad buying system 50 and/or approve the digital advertising creatives for display by the network connected non-personal digital device 10.

Network connected non-personal digital device 10 may display content in the form of a playlist 10D. The playlist 10D may be generated based on direct-sold data 10A, house content data 10B, and/or data generated by a programmatic creative module 10C, to name a few. The direct-sold data 10A may include data from outside sources, such as companies partnering with the operator of the non-personal digital display 10, where such data is used to display content as desired by the outside sources. The house content data 10B may include data associated with content for display on the non-personal digital device 10 that is sourced directly from the operator of the non-personal digital display 10. The programmatic creative module 10C is configured to receive the approved digital advertisement content from the bidding module 60. The non-personal digital device 10 may then display the digital advertisement creative in combination with the direct-sold 10A and/or house content 10B.

Figure 5E:
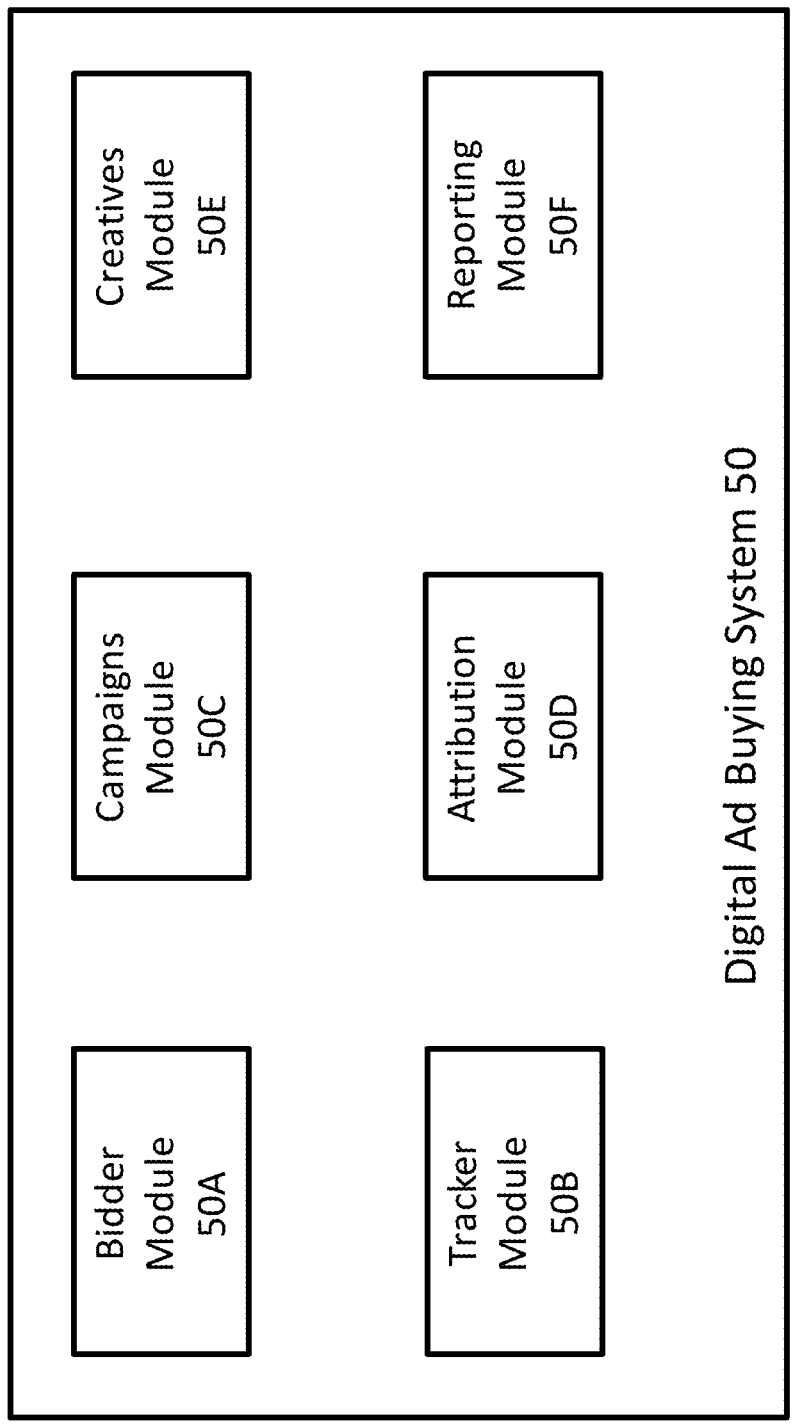

As shown in FIG. 5E, digital ad buying system 50 may include bidder module 50A, tracker module 50B, campaigns module 50C, attribution module 50D, creatives module 50E, and reporting module 50F, to name a few. One or more of the aforementioned modules may be configured to: (i) receive bid requests from the bidding module 60 of the programmatic module 1, (ii) process the bid requests, (iii) generate bid responses, (iv) send the bid responses to the bidding module 60, (v) send digital advertising creatives to the bidding module 60, and/or (vi) perform an attribution process based on impression notifications received from the bidding module 60 and other events tracked by the digital ad buying system 50 and/or an integrated measurement platform 40.

Turning back to FIG. 5A, measurement module 30, may be configured to receive a play notification from bidding module 60. In embodiments, measurement module 30 may further be configured to interact with one or more personal electronic devices 22-1-22-N, and digital ad buying system 50 so that, as previously explained, the measurement module 30 may dynamically link actions performed on personal electronic devices 22-1 . . . 22-n in response to a call to action within the advertisements, with tracking in the digital ad buying system 50. Specifically, as shown in FIG. 5A, the measurement module 30 may send "physical click" information to the digital ad buying system 50, where such information may be generated by the measurement module 30 performing actions including, for example, (i) receiving the call-to-action (CTA) response from a viewer's mobile device, (ii) retrieving the associated auction information by matching against attributes of the CTA (e.g., device-specific advertising identifier, date/time, location, campaign association, keyword), (iii) appending the auction identifier and device-specific advertising identifier information to the extracted click-tracker, and (iv) mapping the CTA to the click-tracker (e.g., trigger the tag to ensure tracking of the "physical click" action by the digital ad buying system 50). Other "events" or actions taken on the one or more personal electronic devices 22-1 . . . 22-N may be separately tracked by the digital ad buying system 50 such that the digital ad buying system 50, and/or the integrated measurement platform 40, may perform post-click attribution and/or post-view attribution. Post-click attribution may be performed by the digital ad buying system 50 and/or by the integrated measurement platform 40, by establishing connection between physical click actions in direct response to a CTA embedded in a digital advertisement on a non-personal digital device event and one or more impression notifications sent by the bidding module 60. Post-view attribution may be performed by the digital ad buying system 50 and/or by an integrated measurement platform 40, by establishing connection between other actions taken by consumers, which are related, but not in direct response to, a digital advertisement on a non-personal digital device (such as visiting a website, and/or purchasing a product, etc.) and one or more impression notifications sent by the bidding module 60.

FIGS. 6A-6F are conceptual flow diagrams showing a bidding process in accordance with exemplary embodiments of the present invention.

Figure 6A:
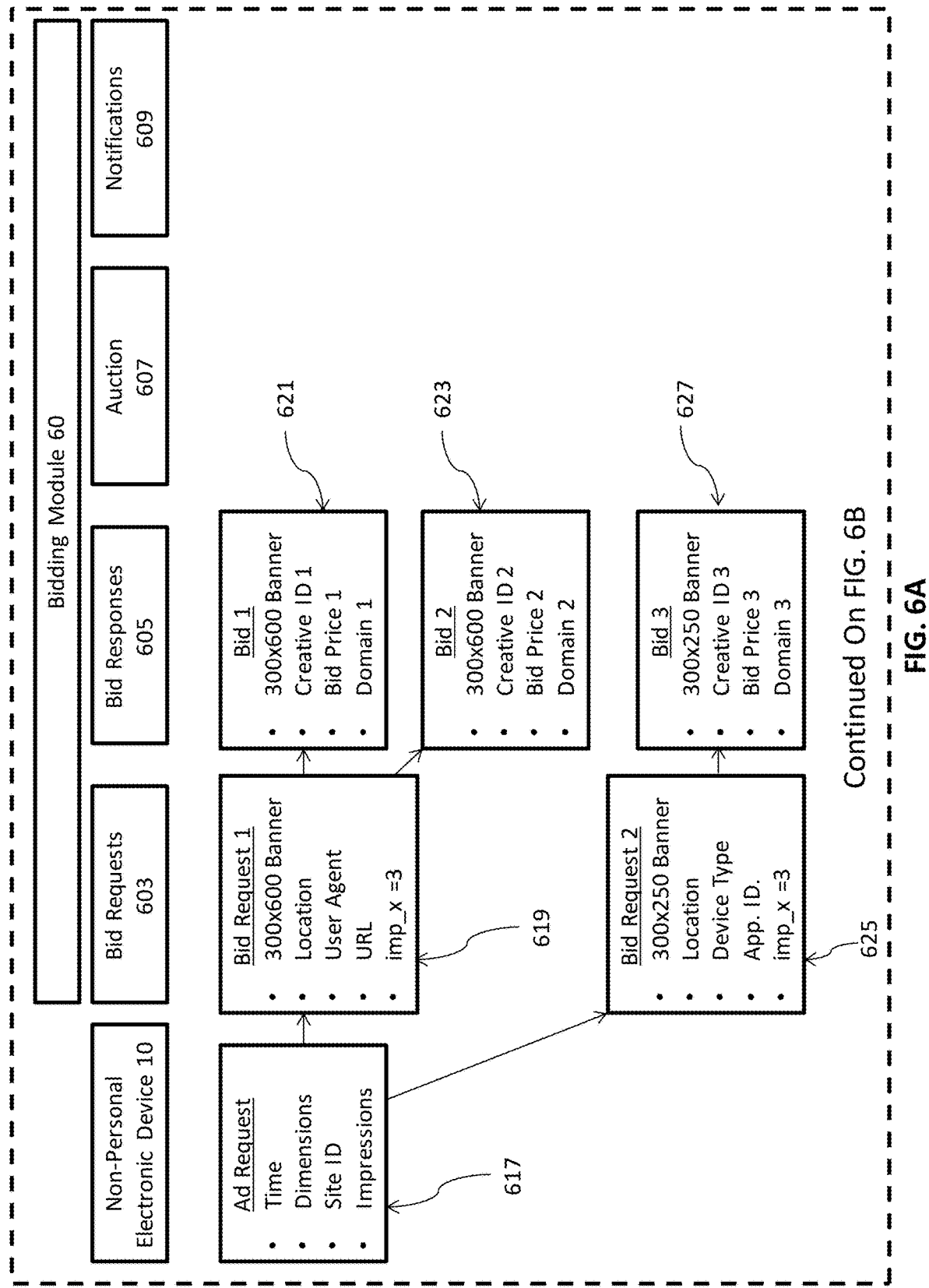
FIGS. 6A-6I are conceptual flow diagrams showing the bidding process in accordance with exemplary embodiments of the present invention.

As shown in FIG. 6A, the bidding process may involve interactions between various components, as previously described, to allow for generation and/or communication of bid requests 603 related to one or more ad slots available on the non-personal digital device 10, receipt and processing of bid responses 605, performance of an auction 607 involving the received bid responses 605, generation of notifications 609 of winning bid responses, and tracking and measurement of the digital advertisement associated with the winning bid response. In this regard, the non-personal digital device 10 may notify the bidding module 60 of the availability of an ad slot available on the non-personal digital device 10 via information included in ad request 617 (which may be similar to step S402 described above in connection with FIG. 4). Such notification may include ad slot information, such as, for example, the time period during which the ad slot is available, the dimensions that are acceptable for display within the ad slot, a site ID associated with the non-personal digital device 10 upon which the ad slot is available, and a projected impression number. In response to ad request 617, the bidding module may generate several bid requests, including Bid Request 1 619, Bid Request 2 625 and Bid Request 3 629 (shown in FIG. 6B). In exemplary embodiments, the number of bid requests may depend on the number of digital formats (e.g., IAB standard units, VAST video, device representations, and/or website/app identifiers, to name a few) accepted by the non-personal digital device 10. In the exemplary bidding process shown in FIGS. 6A-6H, the number of acceptable formats is three, so that the bidding module 60 generates three bid requests, including Bid Request 1 619, Bid Request 2 625 and Bid Request 3 629. Each bid request contains information unique to the request. In the example shown, Bid Request 1 619 may include notification that a 300×600 banner slot is available, location information, user agent information, a URL, and impression multiplier information; Bid Request 2 625 may include notification that a 300×250 banner slot is available, location information, device type, application identification, and impression multiplier information; and Bid Request 3 629 may include a notification that a VAST video slot is available, with further information pertaining to the video slot such as, for example, duration time, definition, and min/max bitrate, along with location information and impression multiplier information associated with the ad slot.

Figure 6B:
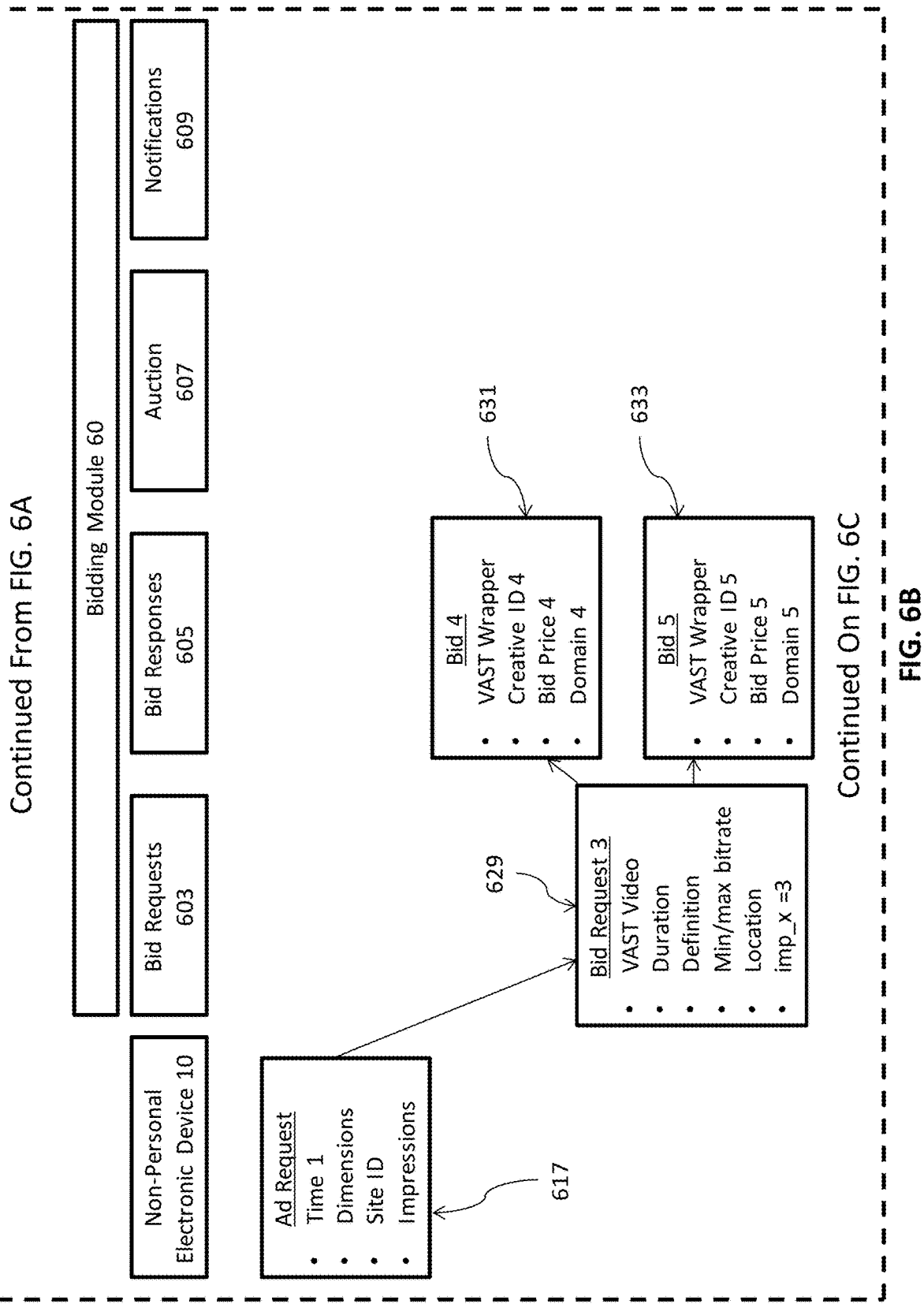

As shown in FIGS. 6A and 6B, the bidding module 60 may receive bid responses from various bidders. In the example shown, a Bid 1 621 and a Bid 2 623 is received in response to Bid Request 1 619, a Bid 3 627 is received in response to Bid Request 2 625, and a Bid 4 631 and a Bid 5 633 is received in response to Bid Request 3 629. The number of bid responses may be equal to the number of available formats (three, in this example), with the number of bids contained within each bid response depending on the actual number of bidders responding (five, in this example). More specifically, in this example, Bid 1 621 and Bid 2 623 include information (for example, a 300×600 banner, creative ID, bid price and domain) relevant to the format associated with the Bid Request 1 619; Bid 3 627 includes information (for example, a 300×250 banner, creative ID, bid price and domain) relevant to the format associated with the Bid Request 2 625; and Bid 4 631 and Bid 5 633 include information (for example, a VAST wrapper, creative ID, bid price and domain) relevant to the format associated with the Bid Request 3 629.

Figure 6C:
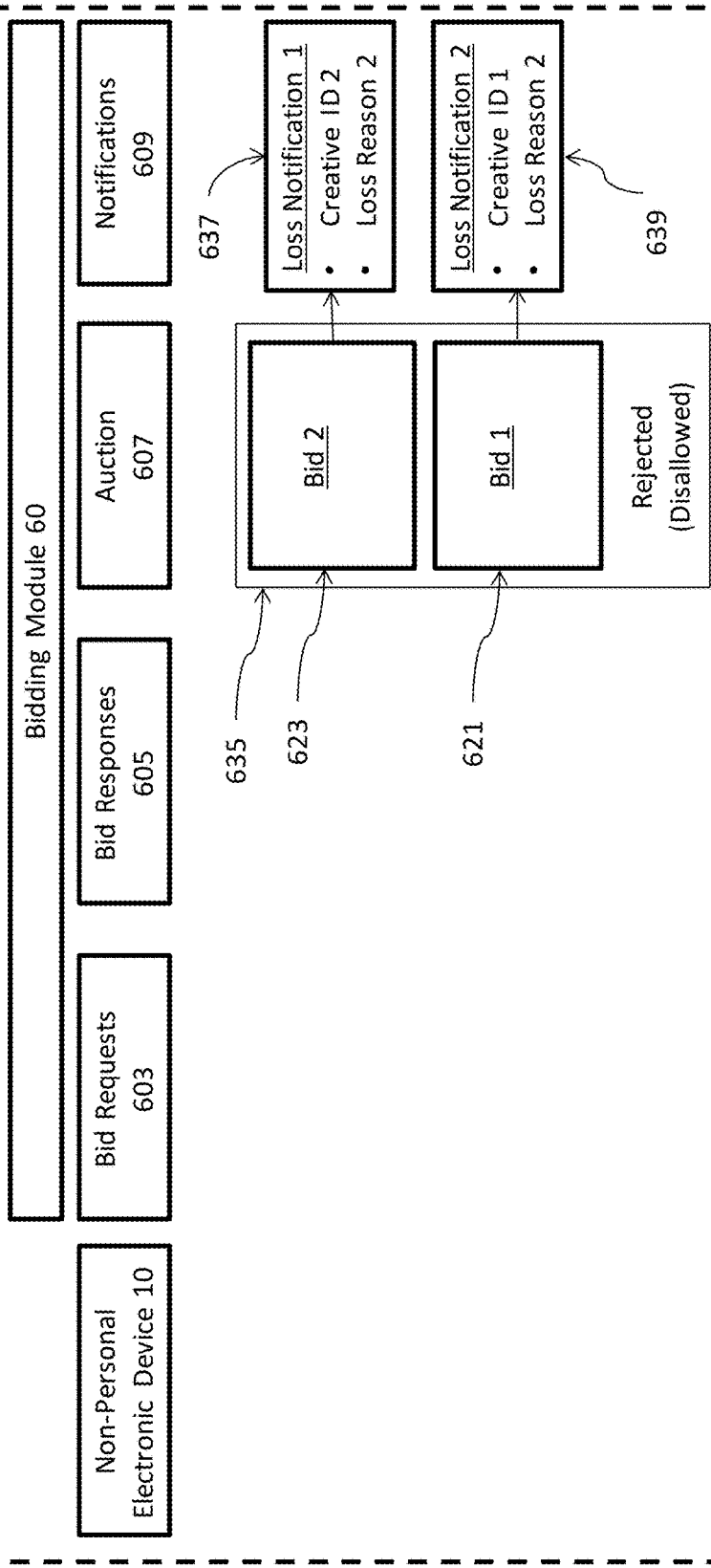
Figure 6D:
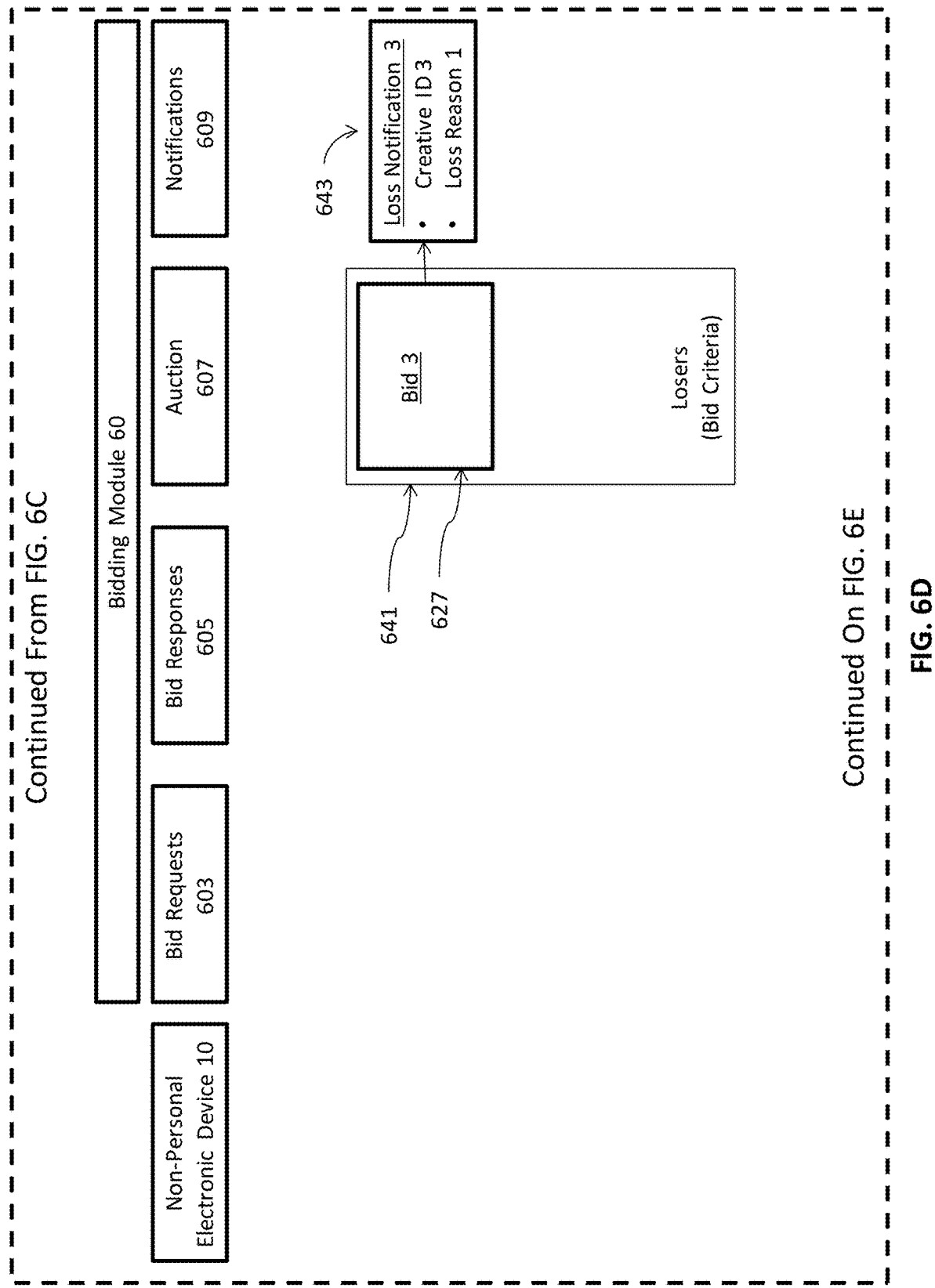

As shown in FIGS. 6C and 6D, the bidding module 60 performs an auction during which a winning bid is selected based on winning bid criteria, such as, for example, the highest price bid. The bids may be first filtered using one or more filtering criteria, such as, for example, whether the bid meets minimum pricing, whether the bid has been reviewed and/or approved for display, or whether the bid matches any relevant private deals, if applicable. The bidding module 60 communicates results of the auction to the various bidders in the form of loss notifications and a win notification. In exemplary embodiments in accordance with the present invention, there may be no (i.e., zero) potential winning bid responses to select from, either before or after filtering. If so, in embodiments, a message or other signal may be sent to the non-personal digital device that there was no winning bid, so that alternate content may be displayed. In the example shown, Bid 1 621 and Bid 2 623 fall into a first group 635 of bids lost due to the ads associated with the bid being disallowed, while Bid 3 627 falls into a second group 641 of bids lost due to the bids failure to meet bid filtering criteria, which may include, for example, failure to meet minimum pricing requirements, the digital advertising creative associated with the bid has not been reviewed nor has it been approved for display, and/or the bid did not match any relevant private deals, if applicable. In this example, the remaining bids, Bid 4 631 and Bid 5 633, meet the filtering criteria, but since Bid 5 633 offers the highest price, Bid 5 633 becomes the winner of the auction (as indicated by reference number 647 in FIG. 6E). As a result, the bidding module 60 sends Loss Notifications 1, 2 and 3 (reference numbers 637, 639, and 643, respectively, in FIGS. 6C and 6D) to the digital ad buying system(s) associated with the losing bids (as well as a loss notification (not shown) to the digital ad buying systems 50-1-50-N associated with the losing bid, Bid 4 631), and sends Win Notifications 1, 2, 3 (reference numbers 655A, 655B and 655C in FIG. 6E) to the digital ad buying system associated with the winning bid. As explained previously, the bidding module 60 may be configured to account for one or more individual impressions associated with the digital advertisement creative. This operation may be performed to account for the possibility that the winning bid is not associated with a one-to-one bid request-to-bid response ratio, but instead may be associated with one winning bid corresponding to more than one impression record (in this case, the X impression estimate is equal to three, and thus three win notifications are generated). In this regard, the bidding module 60 may store, from the winning bid contained in a digital ad buying system's modified bid response, X sets of digital ad buying impression data provided by the winning digital ad buying system necessary to generate a specific won impression data after receiving an initial win notification. The bid communication module 64 may then construct X notifications to communicate the purchase of inventory through existing recording mechanisms operatively connected to the digital ad buying system 50. The X notifications may then be sent by the bid communication module 64 to the winning digital advertisement buying system's notification API.

Figure 6E:
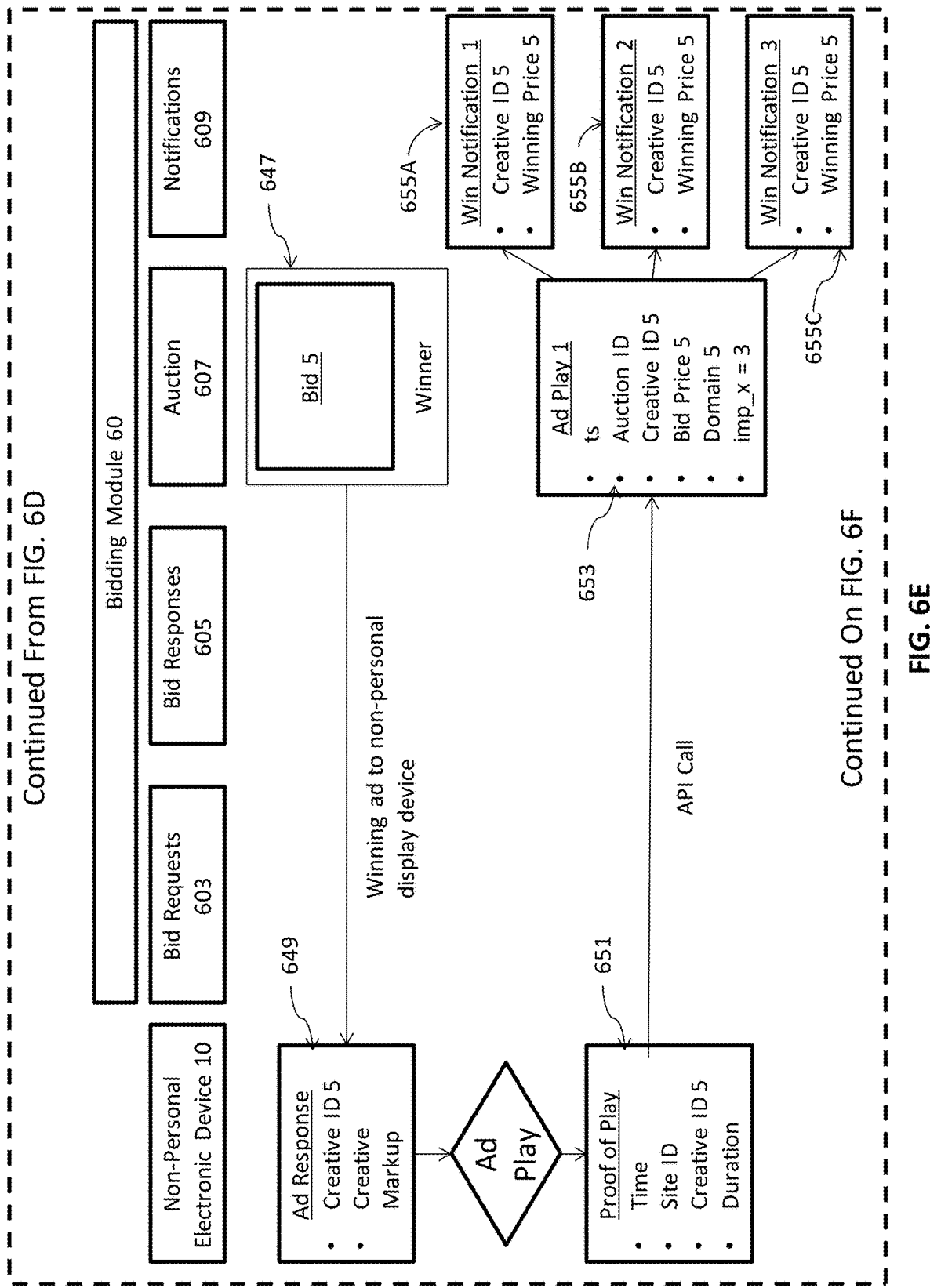

As shown in FIG. 6E, the winning digital advertisement may be sent to the non-personal digital device 10 in the form of an ad request response 649, which may include a creative ID 5 and/or a creative markup. For every play of the ad on the device 10, a proof of play 651 may be sent by the device 10 through an API call, where the proof of play 651 may include information such as, for example, time, site ID, creative ID and/or duration of the ad play. The bidding module 60 may process the proof of play 651 into an ad play 653, including information necessary to generate the individual impression win notifications for each ad play.

Figure 6F:
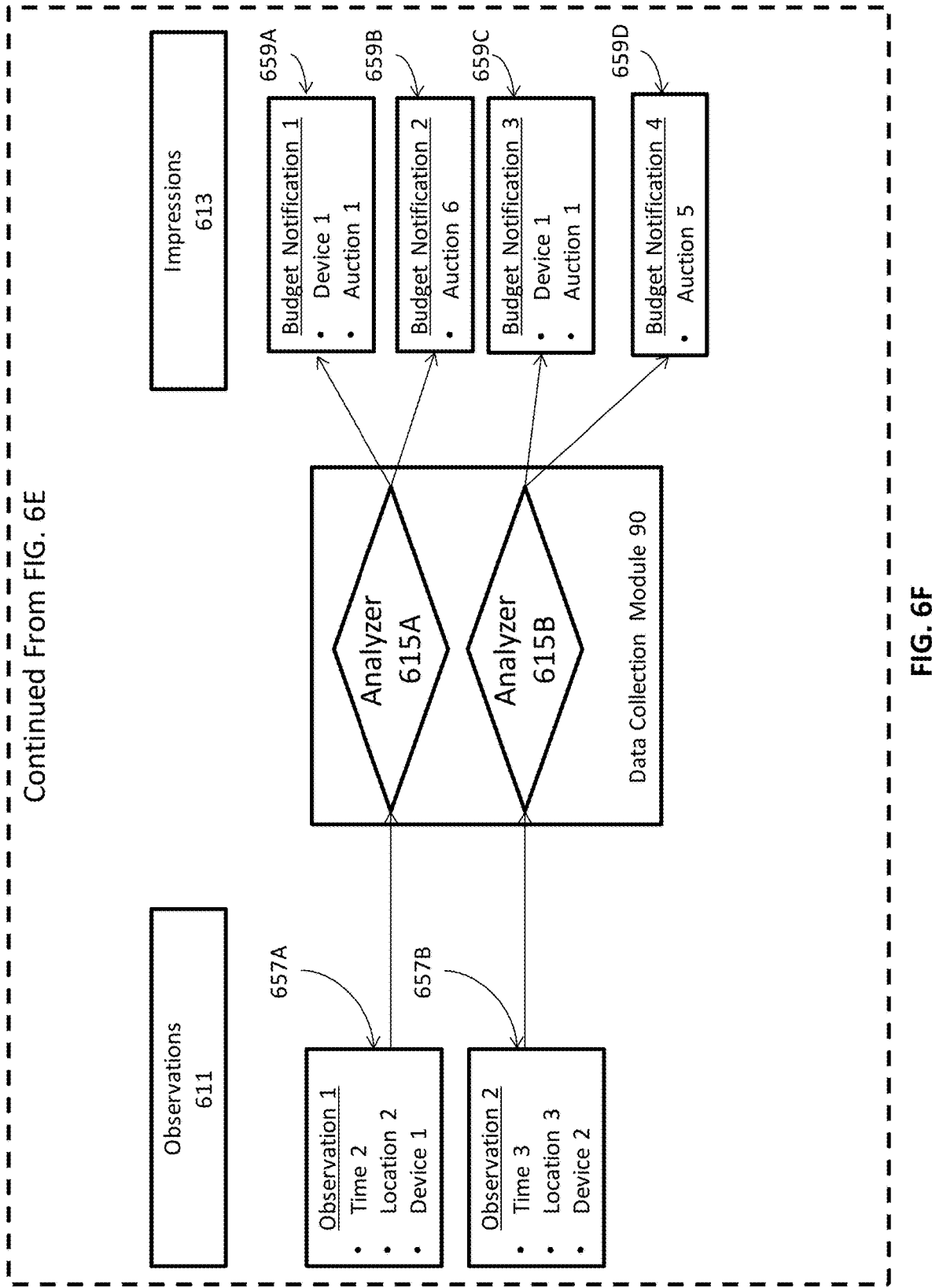

As shown in FIG. 6F, in accordance with exemplary embodiments, advertising plays on the non-personal digital device 10 are translated into impressions 613 associated with device-specific advertising identifiers, thereby enabling advertising operations such as, for example, same-device attribution, cross-device attribution, reach and/or frequency analysis, audience analytics, performance optimization, and/or forecasting, to name a few. In this regard, as previously described, the data collection module 90 may collect observation data (e.g., observations 611) that includes data associated with one or more personal electronic devices 21-1-21-m and may filter the observation data to determine the "actionable" observations corresponding to viewers who were within a viewing geometry of the non-personal digital device during the time in which the advertisement was displayed on the non-personal digital device. This filtering process may filter out "unactionable" observations corresponding to individuals who were not within a viewing geometry of the non-personal digital device during the time in which the advertisement was displayed on the non-personal digital device 10. In the example shown, two observations (Observation 1 657A and Observation 2 657B) are collected and analyzed (reference by Analyzer 615A and Analyzer 615B in FIG. 6F) to determine which observations are actionable observations.

Figure 6G:
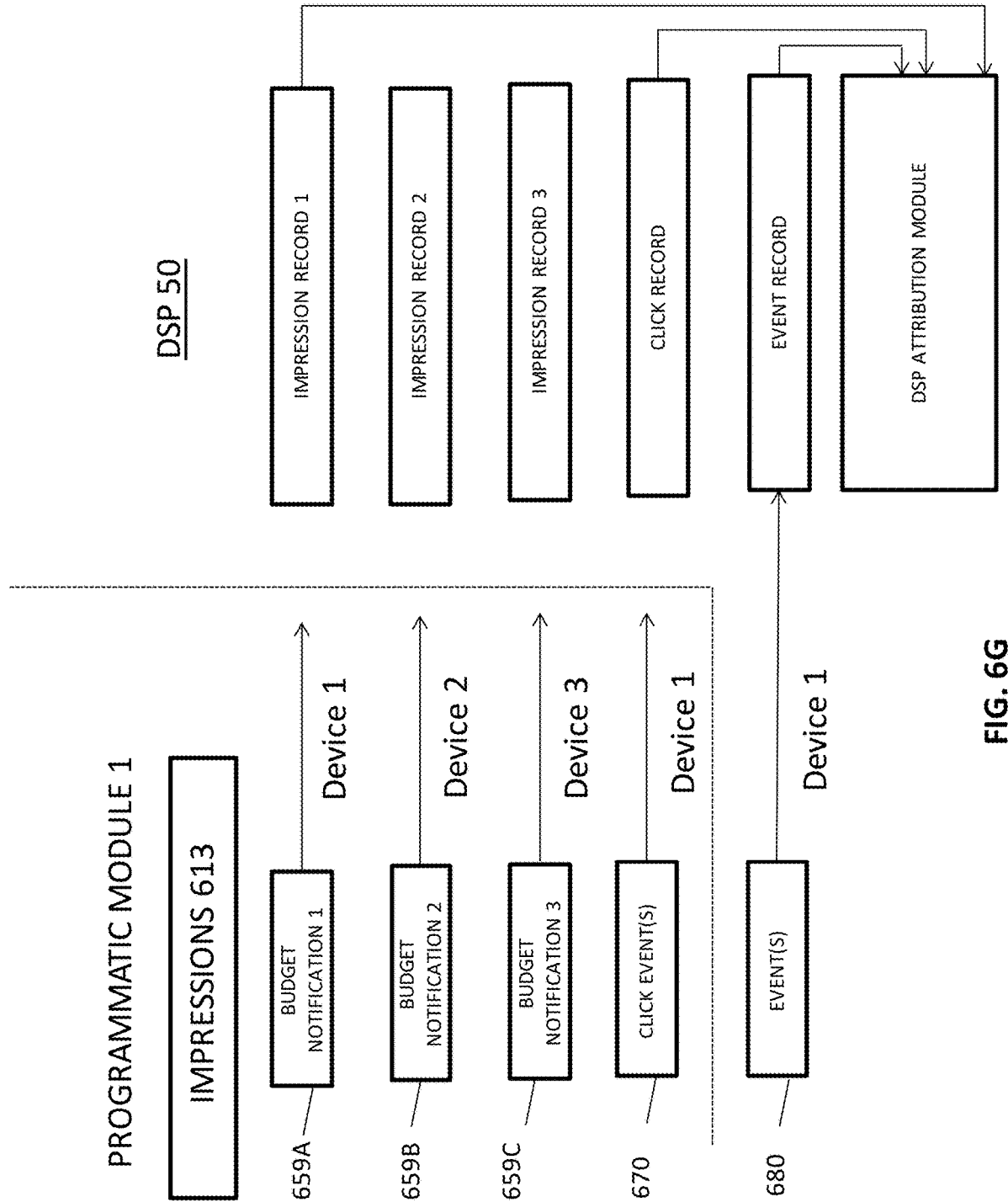
Figure 6H:
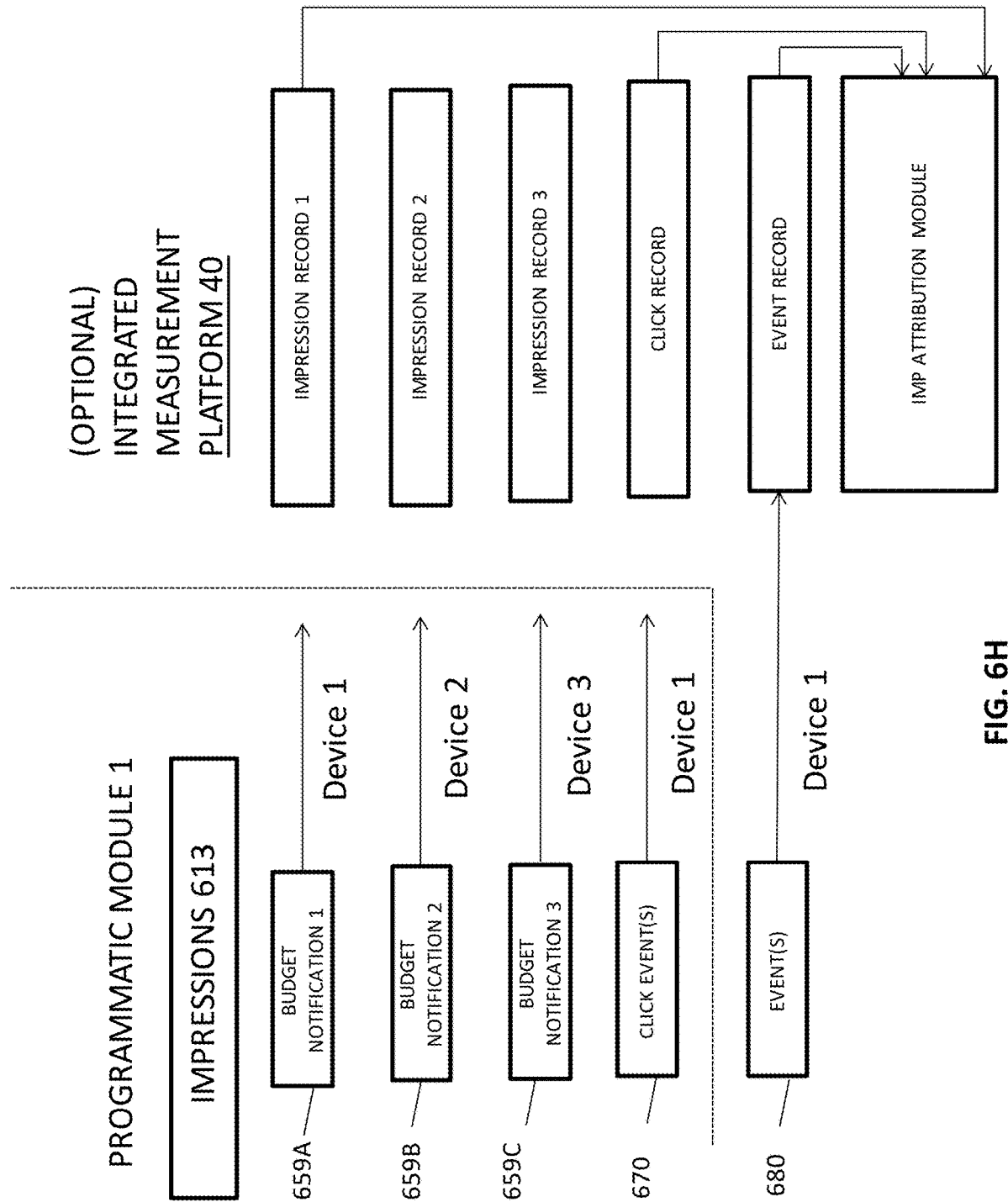
Figure 6I:
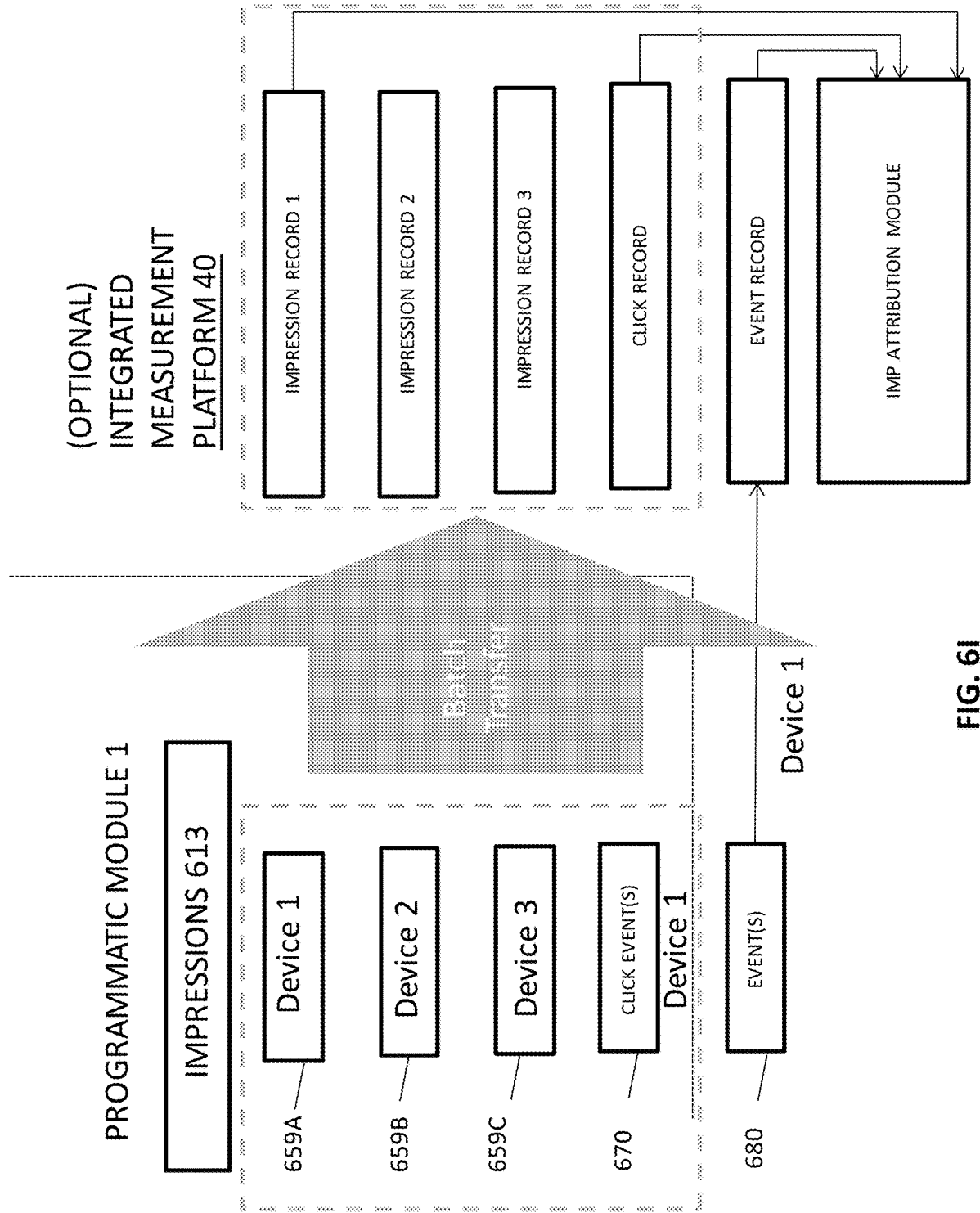

The data collection module 90 may then send notifications of billable impressions 613 to the winning bidder. The example shown includes Budget Notification 1 659A, Budget Notification 2 659B, and Budget Notification 3 659C, with each notification associated with a corresponding device (Device 1, Device 2, or Device 3 in this example and shown in FIG. 6G) and auction (auction 1 and auction 6 in this example). The notification module 90 may substitute each of the placeholder identifiers that were communicated at auction time with a corresponding one of the one or more device-specific advertising identifiers obtained from the actionable observations, corresponding to one or more personal electronic devices 21-1-21-m owned by and/or associated with viewers of the advertisement. As shown in FIGS. 6G-I, this substitution enables the digital ad buying system 50 and/or the integrated measurement platform 40, to perform an attribution process of the impression to subsequent actions taken by that viewer (e.g., visiting a website, downloading an app, and/or purchasing a product, to name a few). This substitution may occur in real-time (e.g., within a predetermined number of seconds, within a predetermined number of milliseconds, etc.), on a configurable time lag (a predetermined amount of time), or as a batch communication on a configurable time lag.

In the specific example shown in FIG. 6G, the Budget Notifications 1, 2, 3 (659A, 659B, and 659C, respectively) are sent to the digital ad buying system 50, and results in the generation of corresponding impression records (Impressions Records 1, 2, 3 in this example). The digital ad buying system 50 may use the impression records in combination with one or more recorded click event(s) 670 (e.g., a response to a call-to-action as recorded by the programmatic module 1) and/or with one or more event 680 (e.g., not a direct response to a call-to-action, but instead some other subsequent action taken by an observed personal electronic device 21-n and related to the digital advertisement, such as a visit to a website or the purchase of a product) as inputs to an attribution process performed at the digital ad buying system 50. In exemplary embodiments, the one or more event(s) 680 are obtained from a source external to the programmatic module 1 (as indicated by the dashed line in FIG. 6G).

In the specific example shown in FIG. 6H, the Budget Notifications 1, 2, 3 (659A, 659B, and 659C, respectively) are sent to an optional integrated measurement platform 40, and results in the generation of corresponding impression records (Impressions Records 1, 2, 3 in this example). The integrated measurement platform 40 may use the impression records in combination with one or more recorded click event(s) 670 (e.g., a response to a call-to-action as recorded by the programmatic module 1) and/or with one or more events 680 (e.g., not a direct response to a call-to-action, but instead some other subsequent action taken on an observed personal electronic device and related to the digital advertisement, such as a visit to a website or the purchase of a product) as inputs to an attribution process performed at the integrated measurement platform 40. In exemplary embodiments, the one or more events 680 are obtained from a source external to the programmatic module 1 (as indicated by the dashed line in FIG. 6H).

In the specific example shown in FIG. 6I, the Budget Notifications 1, 2, 3 (659A, 659B. and 659C, respectively) are sent to an optional integrated measurement platform 40, and results in the generation of corresponding impression records (Impressions Records 1, 2, 3 in this example). The integrated measurement platform 40 may use the impression records in conjunction with one or more recorded click event(s) 670 (e.g., a response to a call-to-action as recorded by the programmatic module 1) and/or with one or more events 680 (e.g., not a direct response to a call-to-action, but instead some other subsequent action taken on an observed personal electronic device and related to the digital advertisement, such as a visit to a website or the purchase of a product) as inputs to an attribution process performed at the integrated measurement platform 40. In exemplary embodiments, the one or more events 680 are obtained from a source external to the programmatic module 1 (as indicated by the dashed line in FIG. 6I). In the specific example shown in FIG. 6I, the budget notifications 1, 2, 3 (659A, 659B, and 659C respectively) and the recorded click events 670 are sent to the integrated measurement platform 40 in a batch communication (as indicated by the dashed line in FIG. 6I).

Figure 7:
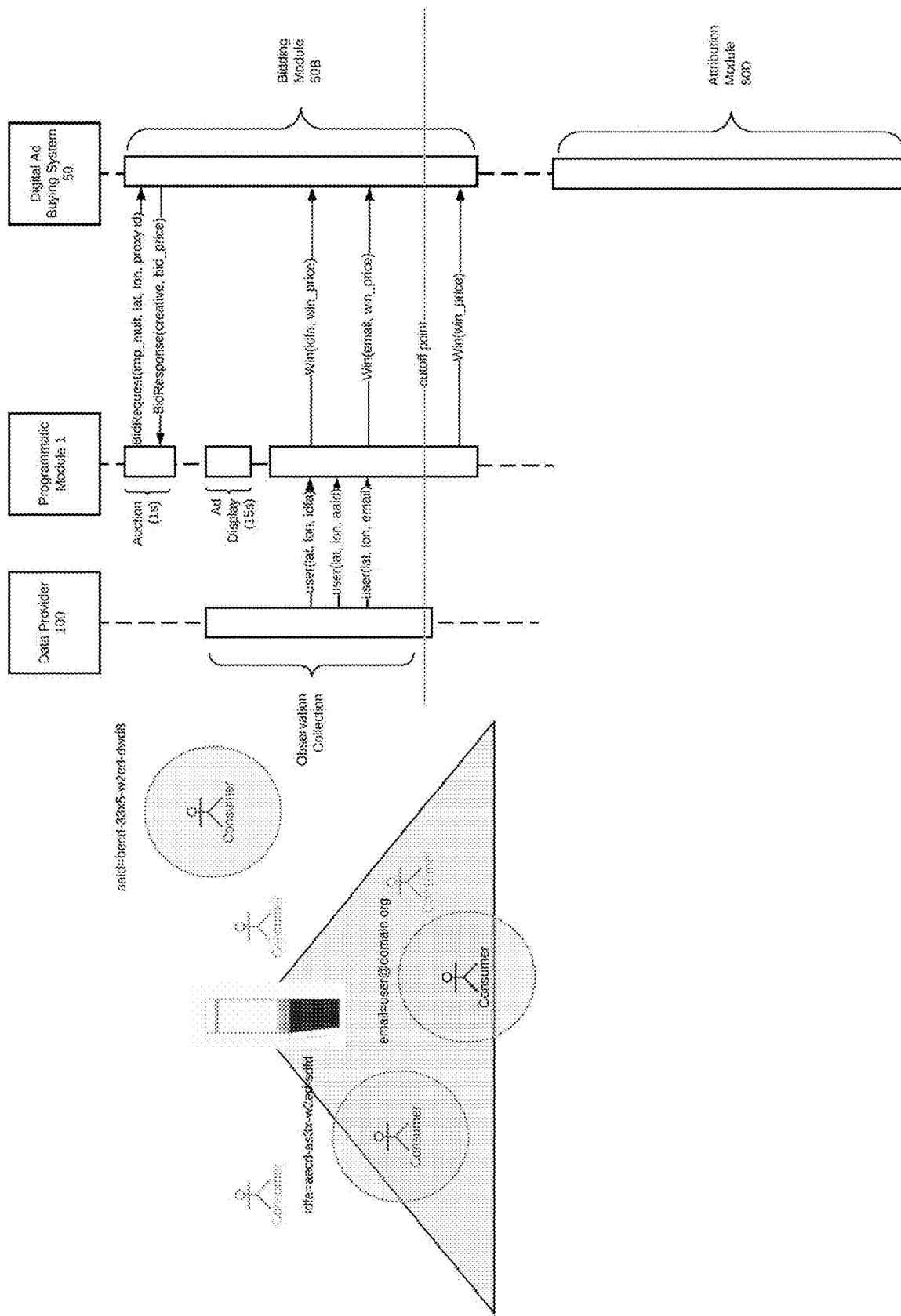
FIG. 7 is an exemplary block diagram of a system for connecting non-personal digital devices to programmatic ad buying systems in accordance with exemplary embodiments of the present invention.

FIG. 7 shows the programmatic module 1 interacting with a digital ad buying system 50, observation data providers and consumers (operating personal electronic devices) in accordance with exemplary embodiments of the present invention. The observation data may be collected directly using one or more sensors that detect presence of one or more user devices within a predetermined viewing geometry relative to the non-personal digital display 10 (in the example shown, the region is in the shape of a cone oriented towards the front of the device, although the geometry may have any other suitable shape, depending on the particulars of the non-personal digital display). Observation data may also be integrated from third parties and delivered via an API. As discussed previously, the programmatic module 1 may generate bid requests and analyze bid responses as part of an auction, and send winning bid notifications to bidders with personal electronic device advertising identifiers collected from observation data to allow a digital ad buying system 50 and/or integrated measurement platform 40 to create impression records and, if applicable, physical click records, with associated device-specific advertising identifiers, which in turn allows for attribution by the digital ad buying system 50 and/or integrated measurement platform 40.

Figure 8A:
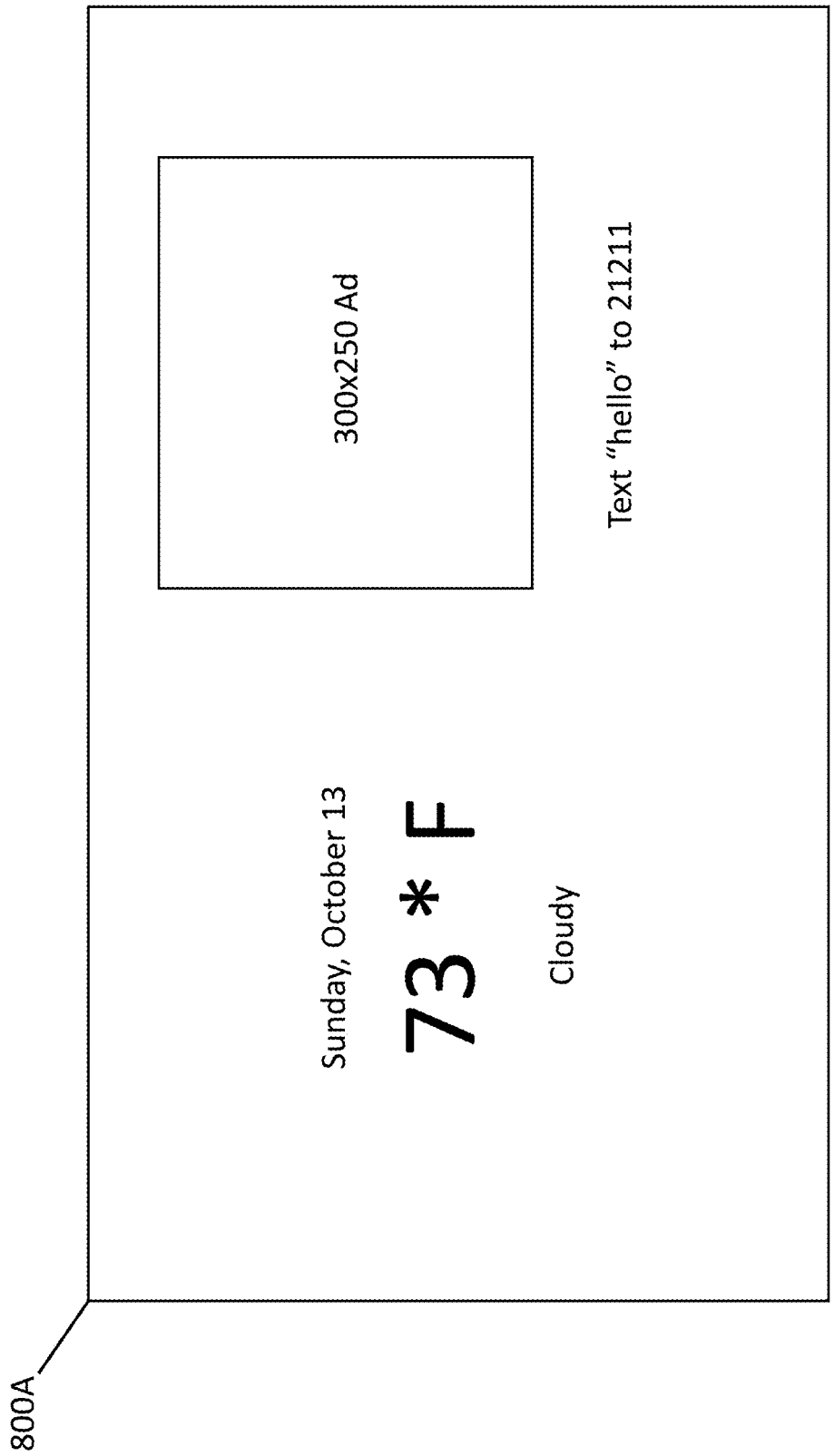
Figure 8B:
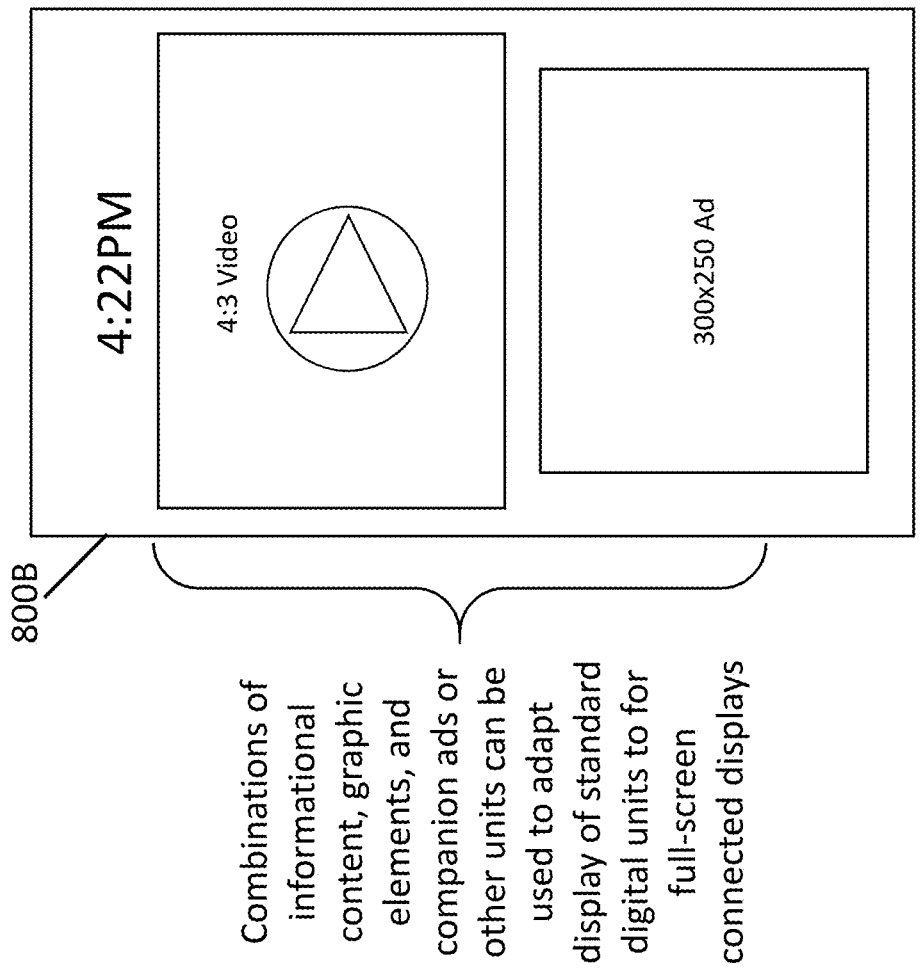
Figure 8C:
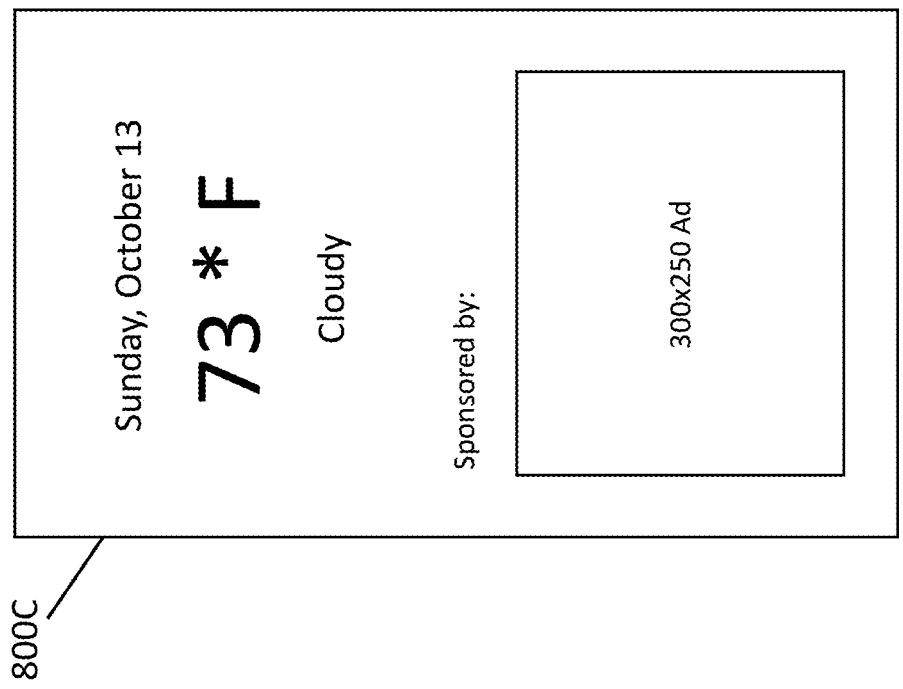
Figure 8E:
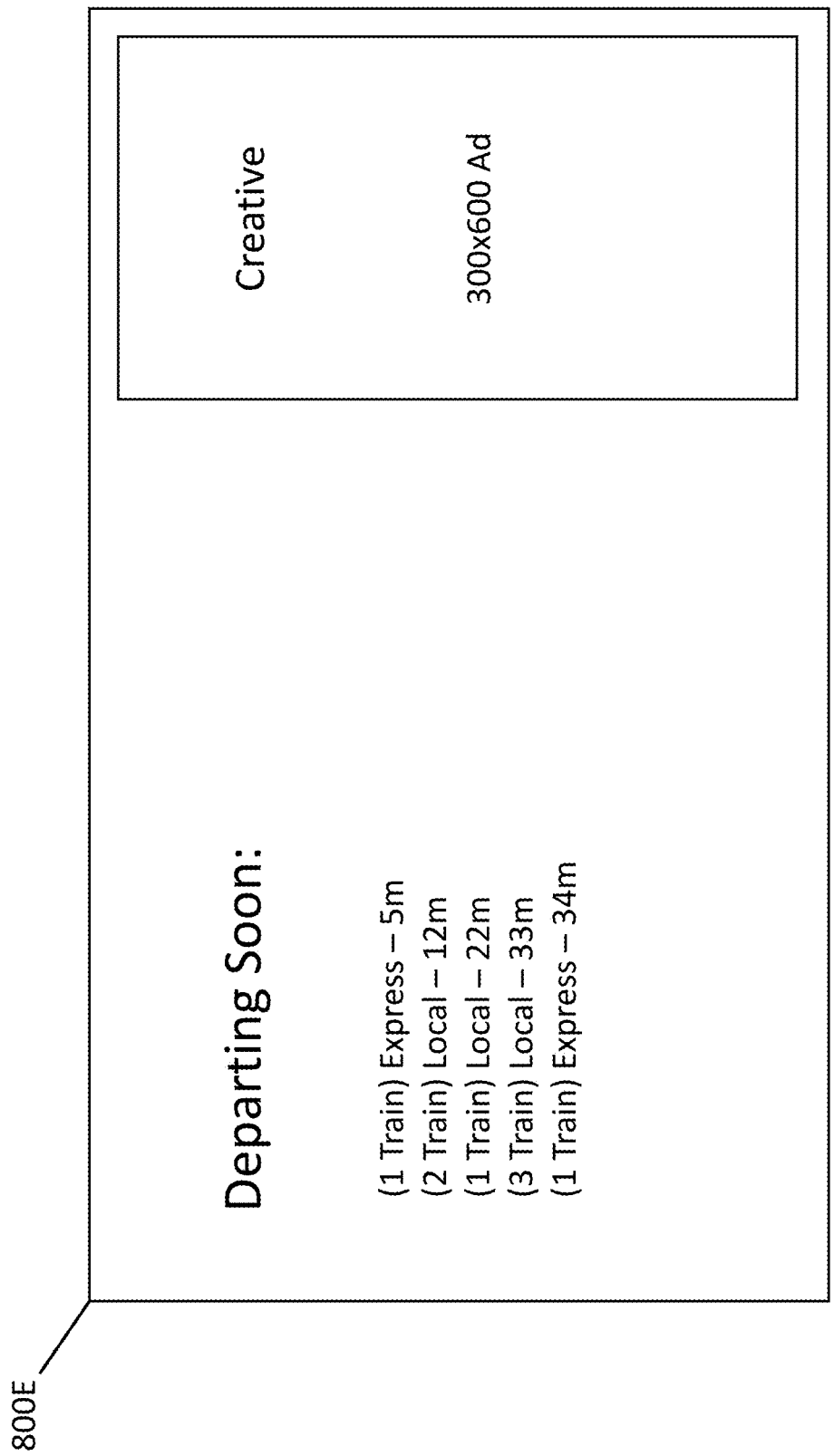
Figure 8F:
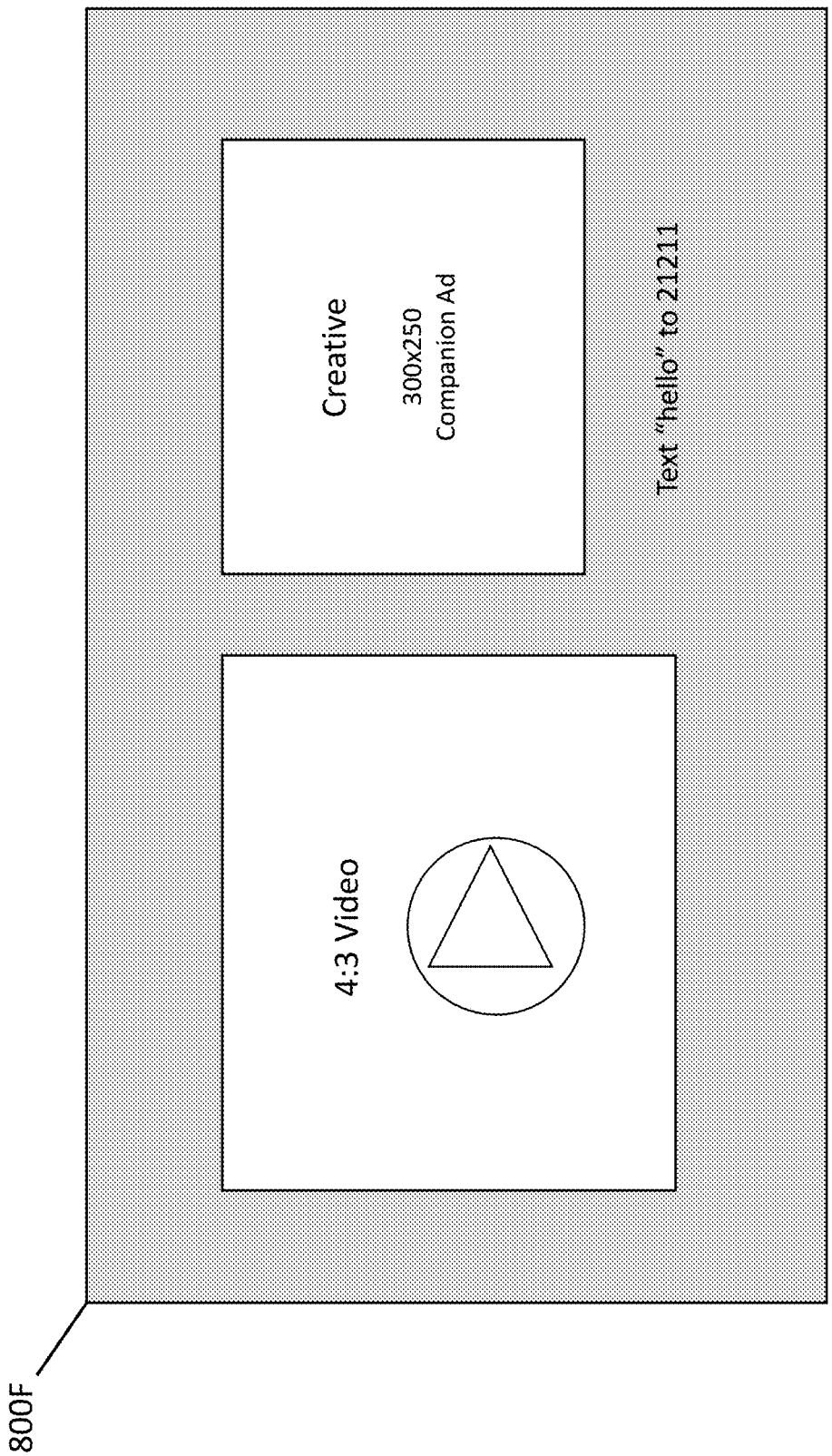

FIGS. 8A-8F are various representative illustrations of a display screen (e.g., monitor 12), generally designated by reference numbers 800A-800F, respectively, of a non-personal digital device 10 in accordance with exemplary embodiments of the present invention. As shown specifically in FIGS. 8A, 8B, 8C, 8E and 8F, a combination of informational content, graphic elements and companion digital advertisements and/or other elements may be displayed within the screen along with the digital advertising creative to adapt display of standard digital units to full-screen connected displays. Alternatively, or in addition, as shown in FIG. 8D, the digital advertisement creative may be linearly "stretched" to scale it to a larger logical size than the standard size (e.g., a 300×250 pixel digital advertising creative may be increased to be 600×500, or 450×375 pixels) so as to provide an improved fit within the screen area, while preserving the aspect ratio and ensuring visual integrity. In exemplary embodiments, the scaled ad may be automatically surrounded with a call-to-action message (FIGS. 8A and 8F) to inform consumers how they may directly interact with the digital advertisement. The remaining space in the ad may be dynamically filled with inserted content, where such content may be, for example, a neutral background image and/or content intended for consumer consumption such as time of day, weather, and local information, to name a few. All of the elements may be used to fill the available display screen space, and/or ensure that the displayed content is attractive and/or useful, while allowing for accommodation of existing standard digital advertising formats designed for display in web browsers, mobile applications, and/or existing video players.

Figure 9:
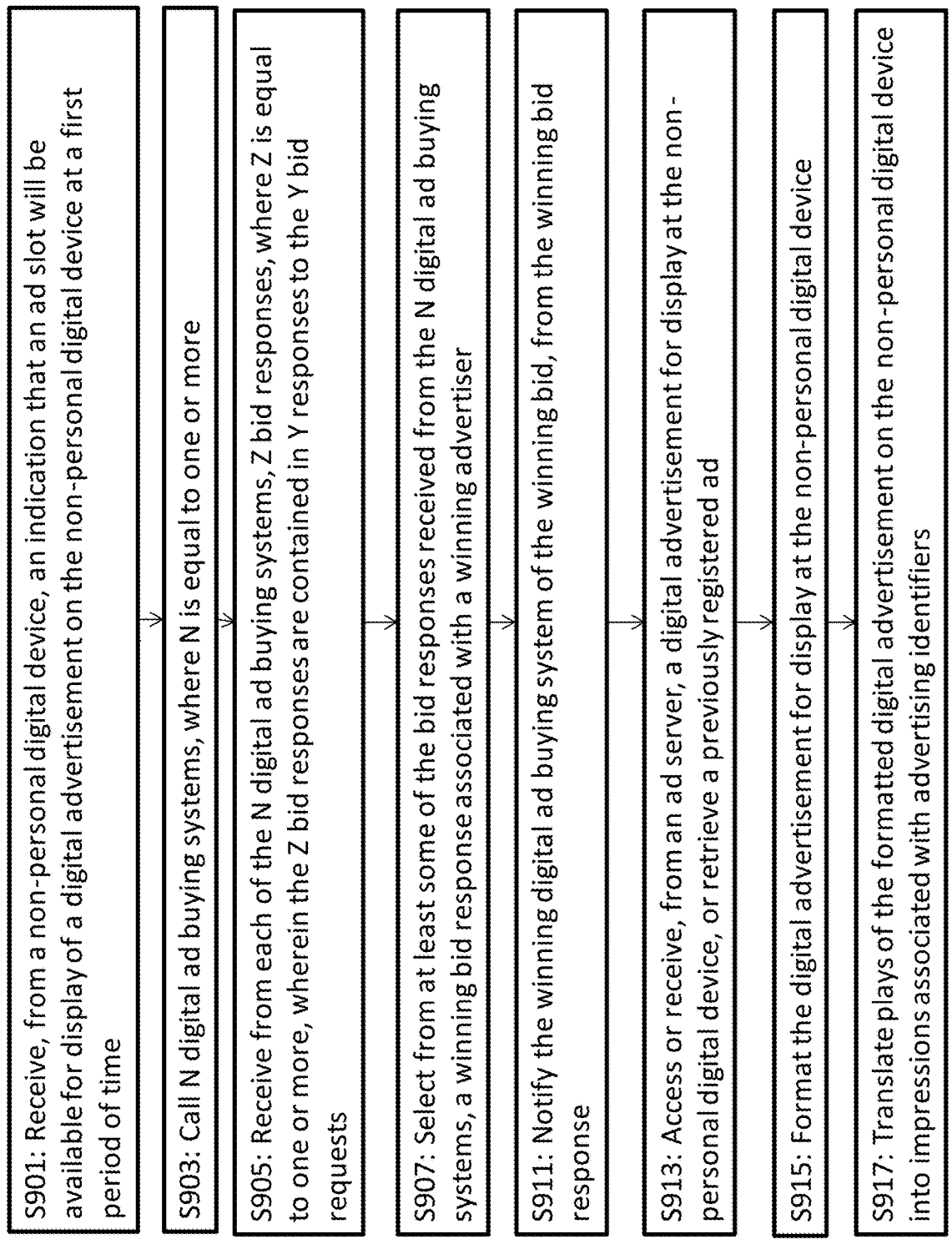
FIG. 9 is an exemplary flowchart of a method for processing bids and enabling attribution based on won bid impressions associated with advertisements intended for display on a non-personal digital display device in accordance with exemplary embodiments of the present invention.

FIG. 9 is a flowchart showing a method for processing bids and enabling of attribution based on won bid impressions associated with digital advertisements intended for display by a non-personal digital display device 10 in accordance with exemplary embodiments of the present invention. In step S901, the programmatic module 1 may receive, from the non-personal digital device 10, an indication that an ad slot will be available for display of a digital advertisement on the non-personal digital device 10 at a first period of time. In step S903, the programmatic module 1 may call N digital ad buying systems 50-1-50-N, where N is equal to one or more. Step S903 may involve, for example: (i) estimating a projected number of advertising impressions at the non-personal digital device during the first period of time so as to generate an impression estimate X; (ii) generating Y bid requests for each of the N digital ad buying systems, where Y is equal to the number of different messages required to express all digital advertising formats supported by the non-personal digital device 10 and digital ad buying system 50; (iii) inserting a single proxy-ID into each of the Y bid requests; and (iv) sending to each of the N digital ad buying systems 50, the Y bid requests, each of the Y bid requests including the impression estimate X and the proxy-ID.

In step S905, the programmatic module 1 may receive, from each of the N digital ad buying systems 50-1-50-N, Z bids, where Z is equal to one or more, wherein the Z bids are contained in Y responses to the Y bid requests. Each bid may include, for example: (i) pricing information associated with pricing the respective digital ad buying system is willing to pay per impression; (ii) at least one of a digital advertising creative or an identifier of a previously registered digital advertising creative, where the digital advertising creative is to be displayed if the bid response is a winning bid response; (iii) metadata associated with the digital advertising creative; and/or (iv) digital ad buying impression data configured for registering up to X impressions in the respective digital ad buying system 50.

In step S907, the programmatic module 1 may select from at least some of the bid responses received from the N digital ad buying systems, a winning bid response associated with a winning advertiser. Step S907 may include, for example: (i) determining bid responses from the at least some of the bid responses that meet minimum pricing requirements; (ii) determining bid responses from the at least some of the bid responses that have been reviewed and approved for display; (iii) upon the condition that one or more private deals are associated with one or more of the Y bid requests, determining bid responses from the at least some of the bid responses that match at least one of the one or more private deals; and/or (iv) selecting the winning bid response, for example, based on the highest price bid, among bid responses that meet minimum pricing requirements, has been reviewed and approved and, if applicable, matches associated private deals.

In step S909, the programmatic module 1 may notify a winning digital ad buying system 50 of the winning bid, from the winning bid response. Step S909 may include, for example: (i) obtaining from the winning bid response, X sets of digital ad buying impression data, the X sets of digital ad buying impression data configured to generate won impression notifications after receiving an initial win notification; (ii) generating X won impression notifications using the obtained X sets of digital ad buying impression data; (iii) generating, by the one or more computers, X unique placeholder advertising identifiers; (iv) appending, by the one or more computers, the X unique placeholder advertising identifiers to the X won impression notifications; and/or (v) sending the X won impression notifications with the appended placeholder advertising identifiers to the winning digital ad buying system 50.

In step S911, the programmatic module 1 may access or receive, from an ad server, a digital advertisement for display by the non-personal digital device 10. The process then proceeds to step S913, where the programmatic module 1 may format the digital advertising creative for display at the non-personal digital device. Alternatively, the programmatic module 1 may access a digital advertising creative already received and stored before the bidding process. Formatting of the digital advertisement may include, for example: (i) modifying the received digital advertising creative to optimize size and location of display on the non-personal digital device; (ii) extracting from the received digital advertisement, one or more ad tags and/or click trackers for capturing data associated with the delivery of the advertisement; (iii) appending a consumer-executable call-to-action to the digital advertisement that can be performed on the one or more personal electronic devices; and/or (iv) adding, by the one or more computers, to the digital advertisement, at least one of design elements or content.

In step S915, the programmatic module 1 may translate recorded plays of the formatted digital advertisement on the non-personal digital device 10 into individual impressions associated with collected actual device-specific advertising identifiers. Such translation may include, for example: (i) collecting observation data including data associated with one or more observed personal electronic devices; (ii) determining, based on the observation data, one or more impressions corresponding to the one or more observed personal electronic devices that were within a predetermined viewing geometry around the non-personal digital device during the first time period; (iii) substituting the one or more placeholder advertising identifiers with the one or more collected actual device-specific advertising identifiers associated with the one or more individual impressions; (iv) appending the one or more ad tags extracted from the digital advertisement, if applicable; and/or (v) sending to the winning digital ad buying system, the one or more collected actual device-specific advertising identifiers with one or more budget notifications and appended ad tags associated with the one or more impressions.

The steps of the process described in connection with FIG. 9 may be rearranged and/or steps may be omitted.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

The invention claimed is:
1. A computer system comprising:
    one or more processors; and
    non-transitory computer-readable memory operatively connected to the one or more processors and having stored thereon machine-readable instructions that, when executed by the one or more processors, cause the one or more processors to perform a method comprising:
    (A) receiving, at the computer system, from a non-personal digital device, an indication that an ad slot will be available for display of a digital advertisement on the non-personal digital device at a first period of time;
    (B) calling, by the computer system, N digital ad buying systems, where N is equal to one or more, the step of calling comprising:
        (i) estimating, by the computer system, a projected number of advertising impressions related to the digital advertisement displayed by the non-personal digital device during the first period of time;
        (ii) generating an impression estimate X based on at least the projected number of advertising impressions;
        (iii) generating, by the computer system, Y bid requests for each of the N digital ad buying systems; and
        (iv) sending, by the computer system, to each of the N digital ad buying systems, the Y bid requests, with each of the Y bid requests comprising the impression estimate X;
    (C) receiving, by the computer system, from each of the N digital ad buying systems, Y bid responses to the Y bid requests, wherein the Y bid responses include Z bids, where Z is equal to one or more, each of the Z bids comprising:
        (i) pricing information associated with a price that a respective digital ad buying system of the N digital buying systems is willing to pay per impression;
        (ii) digital advertisement creative information, wherein the digital advertisement creative information includes at least one of a digital advertisement creative or an identifier associated with a previously registered digital advertisement creative, where the digital advertisement creative is to be displayed in the case where the bid response is a winning bid response; and
        (iii) digital ad buying impression data configured for registering up to X impressions in the respective digital ad buying system;
    (D) selecting, by the computer system, from at least some of the bid responses received from the N digital ad buying systems, a winning bid included in a winning bid response associated with a winning digital ad buying system of the N digital buying systems associated with a winning advertiser;
    (E) notifying, by the computer system, the winning digital ad buying system of the winning bid included in the winning bid response, the step of notifying comprising:
        (i) obtaining, by the computer system, from the winning bid response, X sets of digital ad buying impression data provided by the winning digital ad buying system associated with the winning advertiser, the X sets of digital ad buying impression data configured to generate one or more won impression notifications after receipt of an initial win notification;

(ii) generating, by the computer system, X won impression notifications based on at least the obtained X sets of digital ad buying impression data;

(iii) generating, by the computer system, X unique placeholder advertising identifiers;

(iv) appending, by the computer system, the X unique placeholder advertising identifiers to the X won impression notifications; and (v) sending, from the computer system to the winning digital ad buying system, the X won impression notifications with the appended unique placeholder advertising identifiers;

(F) accessing, by the computer system, the digital advertising creative associated with the winning bid;

(G) formatting, by the computer system, the winning digital advertising creative for display on the non-personal digital device, the step of formatting comprising:

(i) modifying, by the computer system, the winning digital advertising creative to optimize size and location associated with the display of the winning digital advertising creative on the non-personal digital device; and (ii) extracting, by the computer system, from the winning digital advertising creative, one or more click trackers provided for recording interactions and recording events initiated on one or more personal electronic devices associated with one or more consumers exposed to the winning digital advertising creative; and (H) translating, by the computer system, plays of the formatted digital advertising creative on the non-personal digital device into one or more impressions associated with actual device-specific advertising identifiers, the step of translating comprising:

(i) collecting, by the computer system, observation data comprising data associated with one or more observed personal electronic devices, the observation data comprising:

1) one or more actual device-specific advertising identifiers comprised of at least one of: mobile advertising IDs, browser cookies, account user names, e-mail addresses or hashed e-mail tokens;

2) location data; and 3) an observation timestamp indicating a time an observation occurred;

(ii) determining, by the computer system, based on the observation data, one or more impressions corresponding to the one or more observed personal electronic devices that were within a predetermined viewable geometry around the non-personal digital device during the first time period; and (iii) substituting, by the computer system, the one or more placeholder advertising identifiers with the one or more collected actual device-specific advertising identifiers associated with the one or more impressions.

2. The computer system of claim 1, wherein the step (F) of accessing comprises identifying the digital advertising creative information associated with the winning digital advertising creative.

3. The computer system of claim 1, wherein the step (F) comprises receiving the winning digital advertising creative from an ad server.

4. The computer system of claim 1, wherein the step (G) of formatting further comprises:

(iv) determining whether an entire available display area of the non-personal digital device is occupied by the winning digital advertising creative; and (v) upon the condition that the winning digital advertising creative does not occupy the entire available display area of the non-personal digital device, adding, by the computer system, to the winning digital advertising creative, at least one of a design element or content.

5. The computer system of claim 1, wherein the step (G) of formatting further comprises:

(iv) appending, by the computer system, a consumer-executable call-to-action to the digital advertising creative that can be performed on the one or more personal electronic devices.

6. The computer system of claim 1, where the impression estimate X is determined based on at least one of the following data items:

(i) rating agency data from rating agencies;

(ii) network connection data from network connections;

(iii) sensor data collected from one or more sensors;

(iv) the observation data; or (v) mobile application data from one or more mobile applications.

7. The computer system of claim 1, wherein the step of determining an impression estimate X comprises calculating, by the computer system, an estimation of viewers based on a combination of data from a plurality of estimation data sources.

8. The computer system of claim 1, wherein the step of determining an impression estimate X comprises adjusting, by the computer system, obtained estimation data for at least one of: time of day, day of week, seasonality and observational data skew, real-time network activity, or real-time sensor data.

9. The computer system of claim 1, wherein the step of generating, by the computer system, Y bid requests in an appropriate format, comprises the steps of:

(i) identifying, by the computer system, display capabilities of the non-personal digital device; (ii) translating, by the computer system, the display capabilities into one or more standard digital formats that can be displayed given the display capabilities of the non-personal digital device either through direct transformation or composition with other elements; and (iii) generating, by the computer system, for each of the N digital ad buying systems, the Y bid requests each associated with the one or more standard digital formats.

10. The computer system of claim 9, wherein the display capabilities comprise at least one of the following:

(i) screen resolution;

(ii) display size;

(iii) video support;

(iv) computational capacity;

(v) audio capabilities; or (vi) zoning restrictions.

11. The computer system of claim 1, wherein the observation data is collected from a plurality of different observation data sources through an application programming interface.

12. The computer system of claim 11, wherein the method further comprises:

(I) normalizing, by the computer system, the observation data, wherein the step of normalizing comprises the steps of:

(i) translating, by the computer system, observation data from data providers into a standardized format; and
(ii) validating, by the computer system, observation data from data providers by eliminating invalid data, the invalid data comprising at least one of the following:
(a) observation data provided in an invalid format;
(b) observation data provided after a published expiration window;
(c) observation data provided with insufficient fidelity or accuracy, as measured against trusted sources;
(d) observation data provided which was interpolated from a lower-resolution data-source;
(e) observation data provided which exhibits irregularities in distribution; or
(f) observation data that is duplicative with other observation data.

13. The computer system of claim 1, wherein the method further comprises:
(H) generating, by the computer system, a single proxy-ID associated with one or more non-personal digital devices potentially viewed by a unique group of consumers, based on at least one of the following: configurable intervals of time, observed personal devices or computer vision analysis; and
(I) sending, by the computer system, the proxy-ID with each of the Y bid requests, to the N digital ad buying systems so that the computer system allows the digital ad buying systems to perform frequency capping and prevent over-exposure of a group of consumers near a particular non-personal digital device to a particular advertiser campaign or creative.

14. The computer system of claim 1, wherein the method further comprises:
(I) removing observation data associated with one or more personal electronic devices on which personal device restrictions are enabled for distribution of at least one of device-specific advertising identifiers or location information.

15. The computer system of claim 1, wherein the method further comprises:
(H) determining, by the computer system, whether the bid responses contain valid digital advertisement creatives, wherein the step of determining comprises:
(i) determining, by the computer system, whether the bid responses contain a digital advertisement creative that was previously approved;
(ii) determining, by the computer system, whether the bid responses contain a digital advertisement creative that was previously rejected; and
(iii) determining, by the computer system, whether the bid responses contain a digital advertisement creative with non-reviewed status.

16. The computer system of claim 15, wherein the step of determining, by the computer system, whether the bid responses are valid comprises at least one of the following steps:
(iv) receiving, at the computer system, non-reviewed digital advertisement creatives from the digital ad buying systems, in real-time during the electronic bidding process or in advance, prior to the electronic bidding process, wherein the step of receiving comprises at least one of the following:
(1) identifying, by the computer system, non-reviewed digital advertisements;
(2) providing, at the computer system, an application programming interface allowing for submission of new digital advertisements for review; or
(3) determining, by the computer system, previously rejected bid responses with non-reviewed digital advertisement creatives to identify digital advertisement creatives needing review;
(v) converting, by the one or more computer systems, formatted digital advertisements into image or video representations for review by publishers to determine approved or rejected status;
(vi) providing, by the computer system, a graphical user interface to allow for review and correction of metadata associated with a digital advertisement creative; or
(vii) providing, by the computer system, workflow consistent with a required sequence of multiple reviewers or review processes.

17. The computer system of claim 1, wherein the method further comprises:
(I) dynamically identifying, by the computer system, actions performed on the one or more observed personal devices in direct response to a call to action in the digital advertising creative displayed on the non-personal digital device, wherein the step of dynamically identifying comprises:
(i) receiving, at the computer system, from at least one of the one or more observed personal electronic devices, an indication that a direct response to the call-to-action was performed;
(ii) retrieving, by the computer system, at least one of an associated advertisement auction identifier, an associated digital advertising campaign identifier, or an associated digital advertising creative identifier by matching against attributes of the call-to-action response;
(iii) appending, by the computer system, (a) the actual device-specific advertising identifier associated with the at least one of the one or more observed personal electronic devices and (b) the at least one of the associated advertisement auction identifier, the associated digital advertising campaign identifier, or the associated digital advertising creative identifier, to the extracted one or more click trackers;
(iv) performing, by the computer system, a virtual consumer action using the extracted one or more click trackers as appended, to allow the winning digital ad buying system to track an event corresponding to the direct response to the call-to-action; and
(v) in association with performance of the virtual consumer action, triggering the one or more click trackers with the appended device-specific advertising identifiers and the at least one of the associated advertisement auction identifier, the associated digital advertising campaign identifier, or the associated digital advertising creative identifier, so as to register the virtual consumer action in the winning digital ad buying system.

18. The computer system of claim 17, wherein the call-to-action comprises at least one of: transmission of an SMS, MMS or other messaging system message, visit to a pre-defined webpage URL, scanning of a QR code and execution of an associated embedded action, e-mailing a pre-defined e-mail address, executing a command within an associated computer application, scanning of a coupon code, placing a call to a unique call-tracking telephone number, or posting a social media message with a unique hashtag.

19. The computer system of claim 17, wherein the attributes of the call-to-action comprises at least one of: date of the call-to-action, time of the call-to-action, an advertising campaign associated with the call-to-action or a keyword associated with the call-to-action.

20. The computer system of claim 1, wherein the method further comprises the steps of:
(I) identifying, by the computer system, the one or more impressions; and
(J) sending, by the computer system, the one or more impressions to the winning digital ad buying system or an integrated measurement platform associated with the winning digital ad buying system within a timeframe allowing the one or more impressions to be associated, by virtue of the appended device-specific advertising identifiers and at least one of an associated advertisement auction identifier, an associated digital advertising campaign identifier, or an associated digital advertising creative identifier, with other events performed on the one or more personal electronic devices and recorded by the winning digital ad buying system or an integrated measurement platform, so as to enable the attribution process within the winning digital ad buying system or the integrated measurement platform, for impressions delivered on non-personal digital devices.

\* \* \* \* \*